(12) United States Patent
Ma et al.

(10) Patent No.: US 12,003,341 B2
(45) Date of Patent: Jun. 4, 2024

(54) COMMUNICATION METHOD AND COMMUNICATIONS APPARATUS FOR REDUCTION OF TRANSMISSION LATENCY OF DOWNLINK DATA

(71) Applicant: Huawei Technologies Co., Ltd., Shenzhen (CN)

(72) Inventors: Ruixiang Ma, Beijing (CN); Shengyu Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 475 days.

(21) Appl. No.: 17/214,412

(22) Filed: Mar. 26, 2021

(65) Prior Publication Data

US 2021/0218513 A1 Jul. 15, 2021

Related U.S. Application Data

(63) Continuation of application No. PCT/CN2019/104375, filed on Sep. 4, 2019.

(30) Foreign Application Priority Data

Sep. 26, 2018 (CN) .......................... 201811126382.7

(51) Int. Cl.
*H04L 1/1867* (2023.01)
*H04W 72/0446* (2023.01)
(Continued)

(52) U.S. Cl.
CPC ....... *H04L 1/1896* (2013.01); *H04W 72/0446* (2013.01); *H04W 72/1273* (2013.01); *H04W 72/535* (2023.01)

(58) Field of Classification Search
CPC ... H04L 1/1896; H04L 5/0053; H04L 5/0082; H04L 1/1864; H04L 5/0023;
(Continued)

(56) References Cited

U.S. PATENT DOCUMENTS 8,312,337 B2 11/2012 Park et al.
2016/0205540 A1 7/2016 Wu
(Continued)

FOREIGN PATENT DOCUMENTS

CN 101931514 A 12/2010
CN 102056324 A 5/2011
(Continued)

OTHER PUBLICATIONS

NTT Docomo, Inc. "DL/UL scheduling and HARQ management," 3GPP TSG RAN WG1 Meeting 91, Reno, USA, R1-1720822, total 8 pages, 3rd Generation Partnership Project, Valbonne, France (Nov. 27-Dec. 1, 2017).

*Primary Examiner* — Michael Y Mapa

(74) *Attorney, Agent, or Firm* — Leydig, Voit & Mayer, Ltd.

(57) ABSTRACT

A communication method includes: a terminal device determining a first time unit for receiving downlink data, determining, based on a nonnegative integer k1 corresponding to the downlink data, a second time unit in which feedback information corresponding to the downlink data is located, where a length of the first time unit is greater than or equal to a length of the second time unit, k1 represents a quantity
(Continued)

of time units from the first time unit to the second time unit, and the length of the second time unit is less than one slot, and sending, in the second time unit, a feedback codebook to the network device, where the feedback codebook includes the feedback information corresponding to the downlink data. A transmission latency of downlink data is reduced.

18 Claims, 24 Drawing Sheets

(51) Int. Cl.
*H04W 72/1273* (2023.01)
*H04W 72/50* (2023.01)

(58) Field of Classification Search
CPC ... H04L 1/1854; H04L 1/1678; H04L 1/1816; H04L 5/0007; H04L 5/0055; H04W 72/0446; H04W 72/1273; H04W 72/535
USPC ............... 370/329; 455/24, 126, 450–452.2
See application file for complete search history.

(56) References Cited

U.S. PATENT DOCUMENTS

| | | |
|---|---|---|
| 2016/0338041 A1 | 11/2016 | Li et al. |
| 2017/0230961 A1 | 8/2017 | Park et al. |
| 2018/0220323 A1 | 8/2018 | Chen et al. |
| 2020/0178118 A1* | 6/2020 | Lin ........................ H04L 1/1896 |
| 2021/0050961 A1* | 2/2021 | Chen Larsson ....... H04L 1/1861 |
| 2021/0203452 A1* | 7/2021 | Lin .................... H04W 72/0446 |

FOREIGN PATENT DOCUMENTS

| | | |
|---|---|---|
| CN | 102792748 A | 11/2012 |
| CN | 106358299 A | 1/2017 |
| CN | 107231218 A | 10/2017 |
| CN | 108282881 A | 7/2018 |
| CN | 108307517 A | 7/2018 |
| CN | 108365922 A | 8/2018 |
| CN | 108574987 A | 9/2018 |
| EP | 2731392 A1 | 5/2014 |
| WO | 2016050262 A1 | 4/2016 |
| WO | 2018128474 A1 | 7/2018 |

* cited by examiner

COMMUNICATION METHOD AND COMMUNICATIONS APPARATUS FOR REDUCTION OF TRANSMISSION LATENCY OF DOWNLINK DATA

CROSS-REFERENCE TO RELATED APPLICATIONS

This application is a continuation of International Application No. PCT/CN2019/104375, filed on Sep. 4, 2019, which claims priority to Chinese Patent Application No. 201811126382.7, filed on Sep. 26, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

Currently, after receiving downlink data sent by a network device, a terminal device sends, based on a result of decoding the downlink data, feedback information corresponding to the downlink data to the network device. The feedback information may be specifically an acknowledgment (ACK) or a negative acknowledgment (NACK).

A timing relationship between when the downlink data is received by the terminal device and when the feedback information is sent by the terminal device to the network device satisfies n+k1. n represents a slot in which the terminal device receives the downlink data, and k1 represents a quantity of slots between the slot in which the terminal device receives the downlink data and a slot in which the terminal device sends the feedback information corresponding to the downlink data. For example, it is assumed that k1 is equal to 5. In this case, for downlink data received by the terminal device in an $i^{th}$ slot, the terminal device may send, in an $(i+5)^{th}$ slot, feedback information corresponding to the downlink data received in the $i^{th}$ slot to the network device.

However, in the prior art, there is a problem that a transmission latency of downlink data is relatively high.

SUMMARY

This application provides a communication method and a communications apparatus to reduce a transmission latency of downlink data.

According to a first aspect, an embodiment of this application provides a communication method, applied to a terminal device. The method includes:
determining a first time unit for receiving downlink data;
determining, based on k1 corresponding to the downlink data, a second time unit in which feedback information corresponding to the downlink data is located, where a length of the first time unit is greater than or equal to a length of the second time unit, k1 is a nonnegative integer, k1 represents a quantity of time units from the first time unit to the second time unit, and the length of the second time unit is less than one slot; and
sending, in the second time unit, a feedback codebook to a network device, where the feedback codebook includes the feedback information corresponding to the downlink data.

In the foregoing solution, the terminal device determines the first time unit for receiving the downlink data, determines, based on k1 corresponding to the downlink data, the second time unit in which the feedback information corresponding to the downlink data is located, and sends, in the second time unit, the feedback codebook including the feedback information corresponding to the downlink data to the network device. In this way, in one second time unit, feedback information included in the second time unit can be sent to the network device. Because the second time unit is less than one slot, compared with sending, in one slot, feedback information included in the slot to the network device, a time at which feedback information is sent is advanced, so that a NACK of the downlink data corresponding to the terminal device can be fed back to the network device earlier to enable the network device to retransmit the downlink data, thereby reducing a transmission latency of downlink data.

In an implementable design, when the length of the first time unit is greater than the length of the second time unit, and k1 is equal to 0, the second time unit is the last second time unit in a third time unit, and the third time unit is a first time unit whose number is the same as that of the first time unit for receiving the downlink data.

In the foregoing solution, when the length of the first time unit is greater than the length of the second time unit, and k1 is equal to 0, the second time unit is the last second time unit in the third time unit, and the third time unit is the first time unit whose number is the same as that of the first time unit for receiving the downlink data. This can avoid a problem that a second time unit in which the feedback information corresponding to the downlink data is sent to the network device cannot be determined, and avoid a transmission failure and a resource waste caused by an inconsistent understanding between the network device and the terminal device.

In an implementable design, the length of the first time unit is equal to one slot.

In the foregoing solution, the length of the first time unit is one slot, so that a design can be simplified.

In an implementable design, the feedback codebook includes feedback information corresponding to a candidate occasion of a target first time unit, and the candidate occasion is used by the terminal device to receive the downlink data.

The target first time unit is a set of first time units in which a target second time unit is located, the length of the first time unit is greater than the length of the second time unit, and the target first time unit includes the first time unit for receiving the downlink data. The target second time unit is a set of second time units that is determined based on a k1 set and the second time unit in which the feedback information corresponding to the downlink data is located, and the k1 set is a set of at least one value of k1. Therefore, a problem of how to determine, when a symbol range of a candidate occasion is not fully covered in one second time unit, a quantity of bits of a feedback codebook sent in one second time unit is resolved, and a transmission failure and a resource waste caused by an inconsistent understanding on the quantity of bits of the feedback codebook between the network device and the terminal device are avoided.

In an implementable design, the feedback codebook includes feedback information corresponding to a target candidate occasion, the target candidate occasion includes a candidate occasion in which the last symbol of a target fourth time unit belongs to the target second time unit, and/or a candidate occasion in which the first symbol of the target fourth time unit belongs to the target second time unit, the candidate occasion is used by the terminal device to receive the downlink data, and the target candidate occasion includes the candidate occasion for receiving the downlink data.

The target fourth time unit is a set of fourth time units in which the target second time unit is located, and a length of the fourth time unit is greater than the length of the second time unit. The target second time unit is a set of second time units that is determined based on a k1 set and the second time unit in which the feedback information corresponding to the downlink data is located, and the k1 set is a set of at least one value of k1. Therefore, a problem of how to determine, when a symbol range of a candidate occasion is not fully covered in one second time unit, a quantity of bits of a feedback codebook sent in one second time unit is resolved, and a transmission failure and a resource waste caused by an inconsistent understanding on the quantity of bits of the feedback codebook between the network device and the terminal device are avoided.

In an implementable design, the feedback codebook includes feedback information corresponding to the candidate occasion of the target second time unit, the candidate occasion is used by the terminal device to receive the downlink data, and the candidate occasion includes the candidate occasion for receiving the downlink data.

The target second time unit is a set of second time units that is determined based on a k1 set and the second time unit in which the feedback information corresponding to the downlink data is located, and the k1 set is a set of at least one value of k1. The candidate occasion is determined based on a part of all configured time domain resources used by the terminal device to receive the downlink data, where the part of time domain resources includes a time domain resource whose first symbol belongs to the target second time unit, and/or a time domain resource whose last symbol belongs to the target second time unit. Therefore, a problem of how to determine, when a symbol range of a candidate occasion is not fully covered in one second time unit, a quantity of bits of a feedback codebook sent in one second time unit is resolved, and a transmission failure and a resource waste caused by an inconsistent understanding on the quantity of bits of the feedback codebook between the network device and the terminal device are avoided.

In an implementable design, the length of the second time unit is equal to a half of one slot.

According to a second aspect, an embodiment of this application provides a communication method, applied to a network device. The method includes:

sending downlink data to a terminal device in a first time unit; determining, based on k1 corresponding to the downlink data, a second time unit in which feedback information corresponding to the downlink data is located, where a length of the first time unit is greater than or equal to a length of the second time unit, k1 is a nonnegative integer, k1 represents a quantity of time units from the first time unit to the second time unit, and the length of the second time unit is less than one slot; and receiving, in the second time unit, a feedback codebook from the terminal device, where the feedback codebook includes the feedback information corresponding to the downlink data.

In the foregoing solution, the network device sends the downlink data to the terminal device in the first time unit, determines, based on k1 corresponding to the downlink data, the second time unit in which the feedback information corresponding to the downlink data is located, and receives, in the second time unit, the feedback codebook that is sent by the terminal device and that includes the feedback information corresponding to the downlink data. In this way, in one second time unit, feedback information included in the second time unit is sent to the network device. Because the second time unit is less than one slot, compared with sending, in one slot, feedback information included in the slot to the network device, a time at which feedback information is sent is advanced, so that a NACK of the downlink data corresponding to the terminal device can be fed back to the network device earlier to enable the network device to retransmit the downlink data, thereby reducing a transmission latency of downlink data.

In an implementable design, when the length of the first time unit is greater than the length of the second time unit, and k1 is equal to 0, the second time unit is the last second time unit in a third time unit, and the third time unit is a first time unit whose number is the same as that of the first time unit for sending the downlink data.

In an implementable design, the length of the first time unit is equal to one slot.

In an implementable design, the feedback codebook includes feedback information corresponding to a candidate occasion of a target first time unit, and the candidate occasion is used by the terminal device to receive the downlink data.

The target first time unit is a set of first time units in which a target second time unit is located, the length of the first time unit is greater than the length of the second time unit, and the target first time unit includes the first time unit for sending the downlink data to the terminal device. The target second time unit is a set of second time units that is determined based on a k1 set and the second time unit in which the feedback information corresponding to the downlink data is located, and the k1 set is a set of at least one value of k1.

In an implementable design, the feedback codebook includes feedback information corresponding to a target candidate occasion, the target candidate occasion includes a candidate occasion in which the last symbol of a target fourth time unit belongs to the target second time unit, and/or a candidate occasion in which the first symbol of the target fourth time unit belongs to the target second time unit, the candidate occasion is used by the terminal device to receive the downlink data, and the target candidate occasion includes the candidate occasion for sending the downlink data to the terminal device.

The target fourth time unit is a set of fourth time units in which the target second time unit is located, and a length of the fourth time unit is greater than the length of the second time unit. The target second time unit is a set of second time units that is determined based on a k1 set and the second time unit in which the feedback information corresponding to the downlink data is located, and the k1 set is a set of at least one value of k1.

In an implementable design, the feedback codebook includes feedback information corresponding to the candidate occasion of the target second time unit, the candidate occasion is used by the terminal device to receive the downlink data, and the candidate occasion includes the candidate occasion for sending the downlink data to the terminal device.

The target second time unit is a set of second time units that is determined based on a k1 set and the second time unit in which the feedback information corresponding to the downlink data is located, and the k1 set is a set of at least one value of k1. The candidate occasion is determined based on a part of all configured time domain resources used by the terminal device to receive the downlink data, where the part of time domain resources includes a time domain resource whose first symbol belongs to the target second time unit, and/or a time domain resource whose last symbol belongs to the target second time unit.

In an implementable design, the length of the second time unit is equal to a half of one slot.

For beneficial effects of any foregoing implementation of the second aspect, refer to a corresponding part in the embodiment of the first aspect. Details are not described herein again.

According to a third aspect, an embodiment of the present application provides a network device. The network device has a function of implementing actions of the network device in the foregoing method designs. The function may be implemented by hardware, or may be implemented by hardware executing corresponding software. The hardware or the software includes one or more modules corresponding to the foregoing function.

In a possible design, a structure of the network device includes a processor and a transceiver. The processor is configured to support the network device in performing a corresponding function in the foregoing methods. The transceiver is configured to: support communication between the network device and a terminal device, send information or an instruction in the foregoing method to the terminal device, or receive information or an instruction in the foregoing method from the terminal device. The network device may further include a memory. The memory is configured to: couple to the processor, and store a program instruction and data of the network device.

According to a fourth aspect, an embodiment of the present application provides a terminal device. The terminal device has a function of implementing actions of the terminal device in the foregoing method designs. The function may be implemented by hardware, or may be implemented by hardware executing corresponding software. The hardware or the software includes one or more modules corresponding to the foregoing function. The modules may be software and/or hardware.

In a possible design, a structure of the terminal device includes a transceiver and a processor. The transceiver is configured to support the terminal device in receiving uplink data sent by the foregoing network device, or support the terminal device in sending various instructions such as a feedback codebook to the network device. The processor determines, based on k1 corresponding to downlink data, a second time unit in which feedback information corresponding to the downlink data is located.

According to a fifth aspect, an embodiment of this application provides a communications apparatus, including units, modules, or circuits configured to perform the method according to any one of the first aspect or the possible implementations of the first aspect. The communications apparatus may be a terminal device, or may be a module used in a terminal device, for example, a chip used in the terminal device.

According to a sixth aspect, an embodiment of this application provides a communications apparatus, including units, modules, or circuits configured to perform the method according to any one of the second aspect or the possible implementations of the second aspect. The communications apparatus may be a network device, or may be a module used in a network device, for example, a chip used in the network device.

According to a seventh aspect, an embodiment of this application provides a computer-readable storage medium, configured to store a computer program or an instruction. When the computer program or the instruction is run on a computer, the computer is enabled to perform the method according to any design of the first aspect.

According to an eighth aspect, an embodiment of this application provides a computer-readable storage medium, configured to store a computer program or an instruction. When the computer program or the instruction is run on a computer, the computer is enabled to perform the method according to any design of the second aspect.

According to a ninth aspect, an embodiment of this application provides a computer program product. When the computer program product runs on a computer, the computer is enabled to perform the method according to any design of the first aspect.

According to a tenth aspect, an embodiment of this application provides a computer program product. When the computer program product runs on a computer, the computer is enabled to perform the method according to any design of the second aspect.

DETAILED DESCRIPTION

Figure 1A:
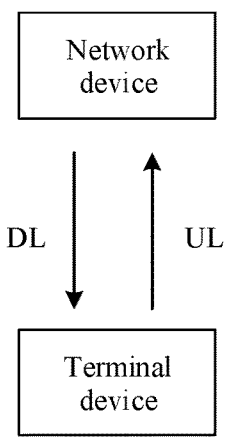
FIG. 1A and FIG. 1B are schematic diagrams of application scenarios according to an embodiment of this application.

FIG. 1A is a schematic diagram of an application scenario according to an embodiment of this application. As shown in FIG. 1A, the application scenario in this embodiment may include a network device and a terminal device. A link from the network device to the terminal device is a downlink (DL), and a link from the terminal device to the network device is an uplink (UL). The network device sends downlink data to the terminal device in a first time unit, and the terminal device sends, in a second time unit, feedback information corresponding to the downlink data to the network device, where a length of the first time unit is greater than or equal to a length of the second time unit, and the length of the second time unit is less than one slot.

For example, the downlink data may be data sent by the network device through a physical downlink shared channel (PDSCH), for example, may be data of an ultra-reliable and low-latency communication (URLLC) service in a 5th generation (5G) communications system. As one of the three typical 5G services, the URLLC service is mainly used in scenarios such as unmanned driving and telemedicine. These application scenarios may have higher requirements on reliability and a latency. In one exemplary embodiment, the requirements of the URLLC service may include: 99.999% of data transmission reliability, a transmission latency less than 1 ms, and signaling overheads reduced as much as possible when requirements for high reliability and a low latency are satisfied. Currently, how to ensure reliability and a latency of URLLC becomes a problem of great concern in this field.

For example, the feedback information corresponding to the downlink data may be sent by the terminal device to the network device through a physical uplink control channel (PUCCH).

It should be noted that, in this embodiment of this application, downlink data sent by the network device to the terminal device in one candidate occasion may be considered as one piece of downlink data, and downlink data sent by the network device to the terminal device in different candidate occasions may be considered as different downlink data. The candidate occasion is used by the terminal device to receive the downlink data.

The network device may include a base station. The base station may be an evolved base station (evolved NodeB or eNB) in long term evolution (LTE), a base station in the 5th generation (5G) mobile communications system (also referred to as a new radio (NR)) which may be referred to as a 5G base station (gNodeB or gNB), a relay station, a vehicle-mounted device, a wearable device, an access network device in a future 5G network, an access network device in a future evolved public land mobile network (PLMN) network, or the like. This is not limited in this application.

The terminal device may also be referred to as user equipment, and may include but is not limited to a customer premise equipment (CPE), a smartphone (such as an Android mobile phone or an iOS mobile phone), a multimedia device, a streaming media device, a personal computer, a tablet, a palmtop, and a mobile internet device (MID), or an internet device such as a wearable intelligent device.

Figure 1B:
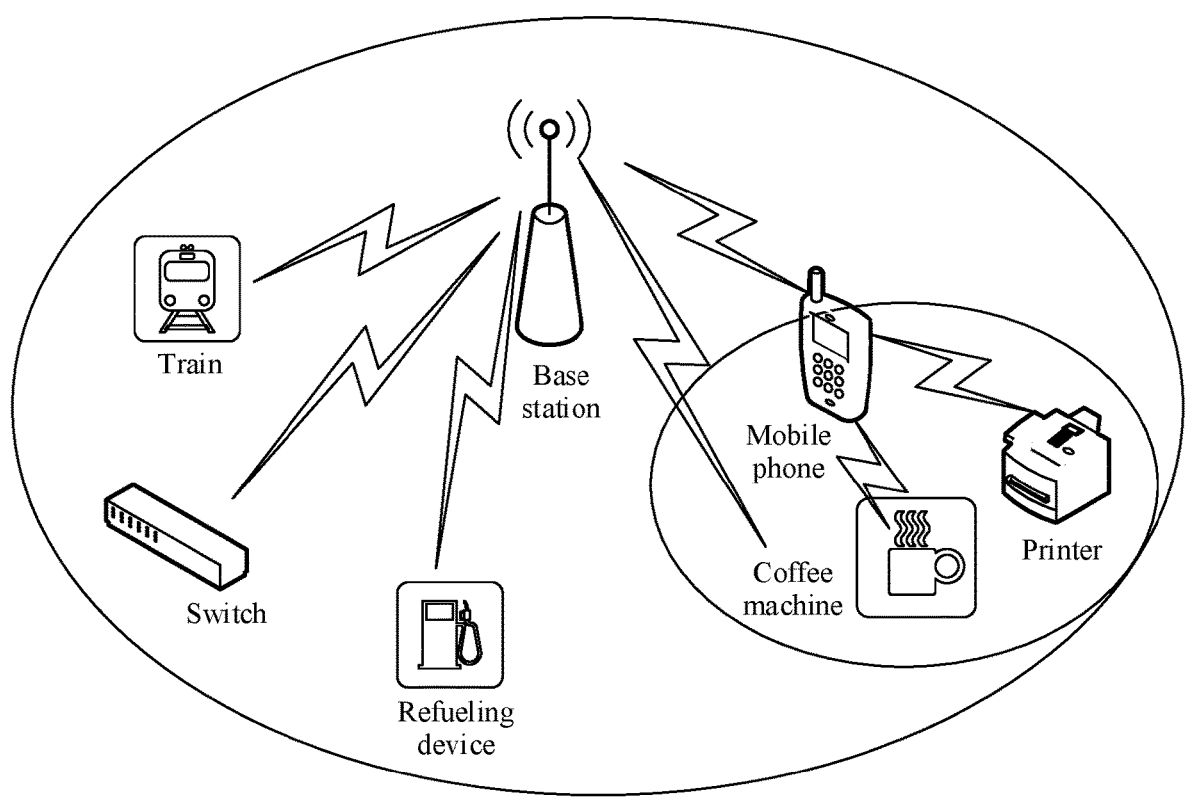

For example, the network device is a base station, and the terminal device includes a train, a switch, a mobile phone, a refueling device, and a coffee machine. For example, application scenarios in this embodiment of this application may be as shown in FIG. 1B. The mobile phone may interact with a printer and the coffee machine.

Figure 1C:
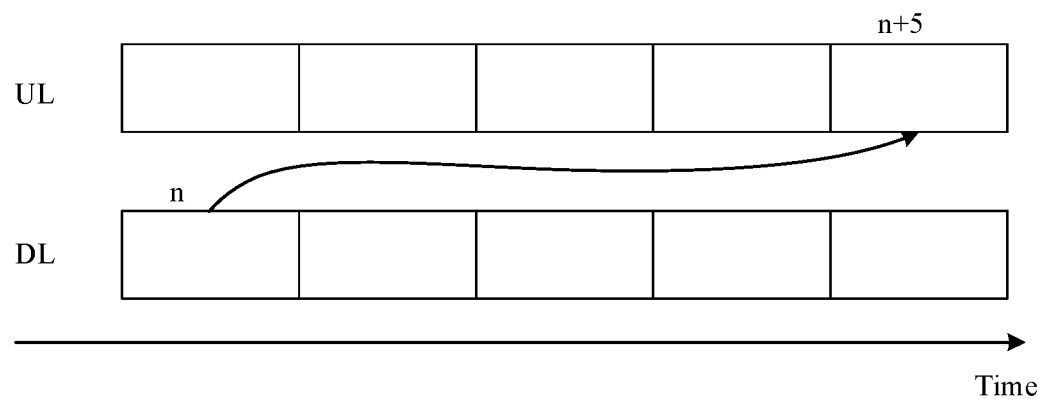
FIG. 1C and FIG. 1D are schematic diagrams of a relationship between a slot in which a terminal device receives downlink data and a slot in which the terminal device sends a downlink data feedback in the prior art.

In the prior art, a timing relationship between when the downlink data is received by the terminal device and when a feedback is sent by the terminal device to the network device satisfies n+k1. n represents a slot in which the terminal device receives the downlink data, and k1 represents a quantity of slots between the slot in which the terminal device receives the downlink data and a slot for the corresponding feedback. For example, it is assumed that k1 is equal to 5. In this case, a relationship between the slot in which the terminal device receives the downlink data and the slot in which the terminal device sends the feedback information corresponding to the downlink data to the network device may be as shown in FIG. 1C. It should be noted that, in FIG. 1C, one rectangular box may represent one slot, n and n+5 represent numbers of slots, n may be understood as an $n^{th}$ slot, and n+5 may be understood as an $(n+5)^{th}$ slot.

Figure 1D:
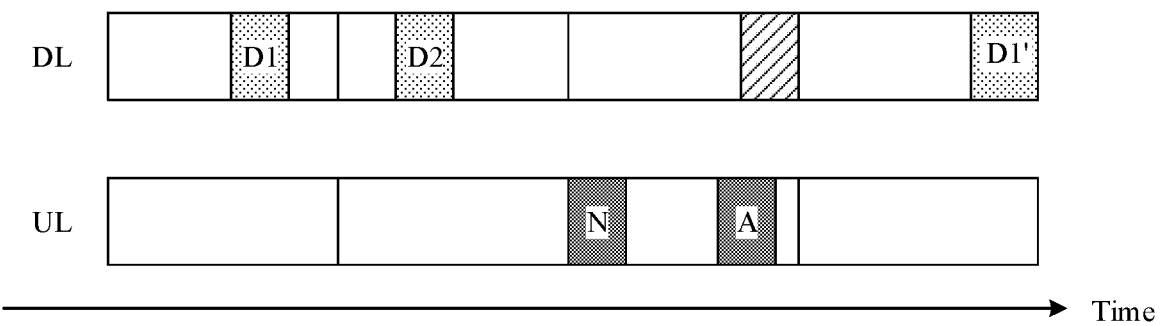

Further, in the prior art, for example, k1 corresponding to downlink data D1 sent by the network device in a slot 1 is equal to 2, k1 corresponding to downlink data D2 sent in a slot 2 is equal to 1, and the terminal device determines that feedback information corresponding to D1 is a NACK (N for short) and feedback information corresponding to D2 is an ACK (A for short). As shown in FIG. 1D, because k1 corresponding to D1 is equal to 2, and k1 corresponding to D2 is equal to 1, the terminal device sends, in a slot 3, both the N corresponding to D1 and the A corresponding to D2 to the network device. After receiving the N corresponding to D1, the network device further retransmits D1 (that is, sends downlink data D') in a slot 4. However, if the terminal device may directly send the N corresponding to D1 to the network device after determining the N corresponding to D1, instead of sending the feedback information together to the network device after the A corresponding to D2 is generated, the network device may retransmit D1 at a location filled with oblique lines in the slot 3. Consequently, there is a problem that a transmission latency of downlink data is relatively high.

The following describes some implementations of the present application in detail with reference to the accompanying drawings. In a case that no conflict occurs, the following embodiments and features in the embodiments may be mutually combined.

Figure 2:
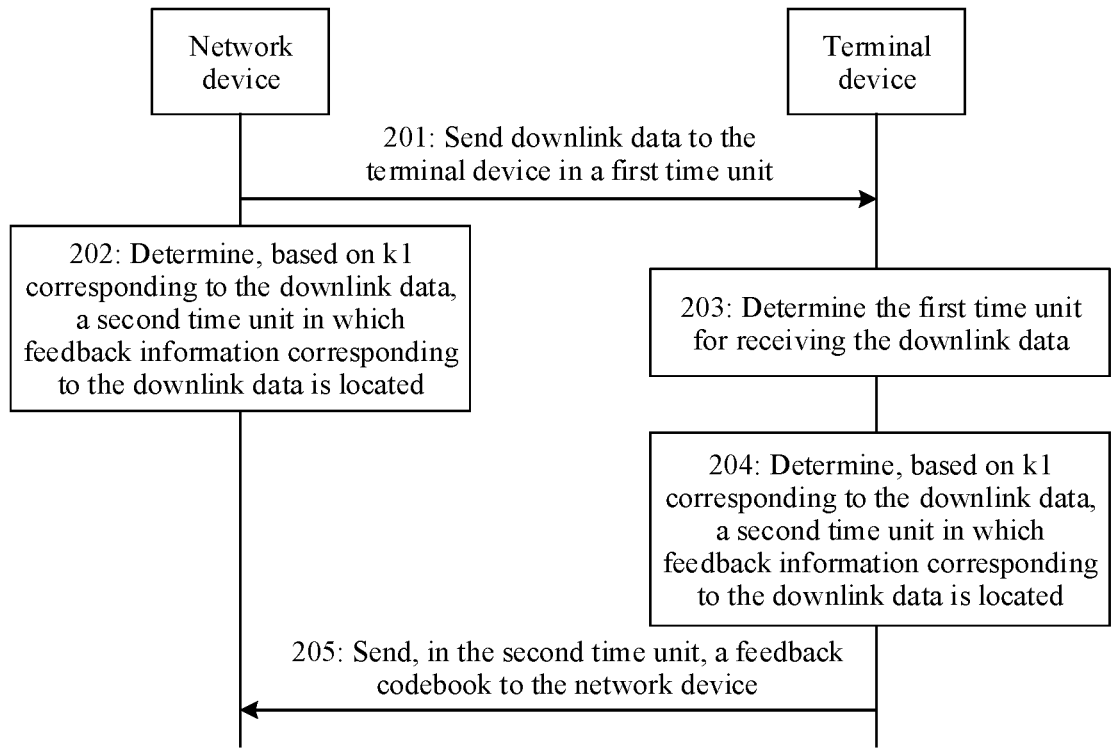
FIG. 2 is a flowchart of a communication method according to an embodiment of this application.

FIG. 2 is a flowchart of a communication method according to an embodiment of this application. As shown in FIG. 2, the method in this embodiment may include the following steps.

At step 201, a network device sends downlink data to a terminal device in a first time unit.

At step 202, the network device determines, based on k1 corresponding to the downlink data, a second time unit in which feedback information corresponding to the downlink data is located.

In this step, a length of the first time unit is greater than or equal to a length of the second time unit, k1 is a nonnegative integer, k1 represents a quantity of time units from the first time unit to the second time unit, and the length of the second time unit is less than one slot.

In this embodiment of this application, a slot is a time domain unit in data scheduling. For example, for a normal cyclic prefix, one slot may have 14 symbols; and for an extended cyclic prefix, one slot may have 12 symbols. In this embodiment of this application, a symbol may also be referred to as a time domain symbol. The time domain symbol herein may be an orthogonal frequency division multiplexing (OFDM) symbol, or may be a discrete fourier transform spread orthogonal frequency division multiplexing (DFTS-OFDM) symbol.

For example, the length of the first time unit may be one slot. The length of the first time unit is one slot, so that a design can be simplified.

Figure 3A:
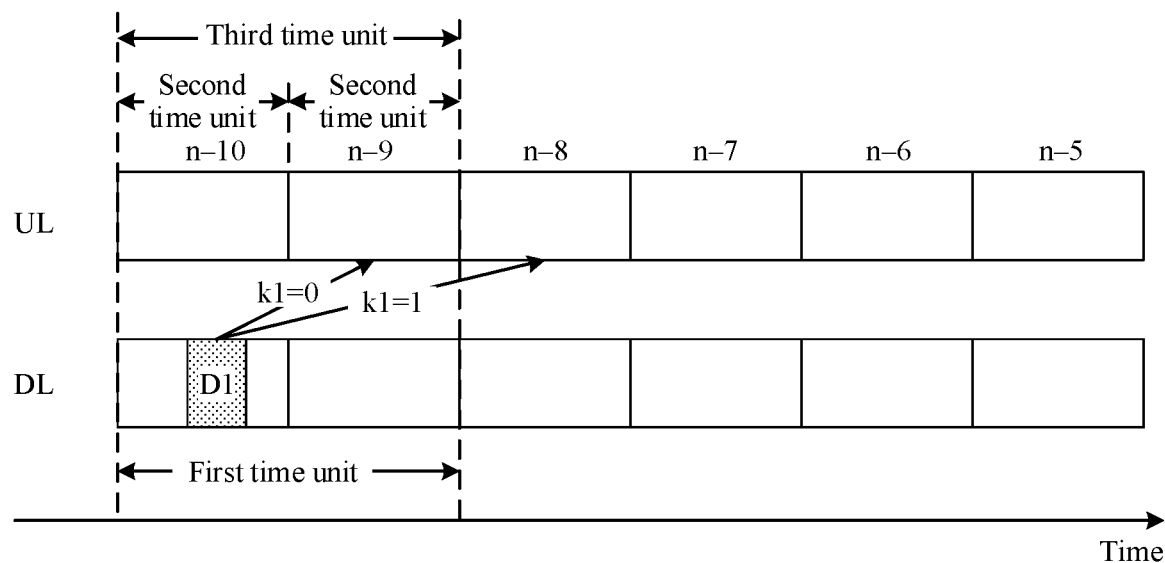
FIG. 3A, FIG. 3B, and FIG. 4 are schematic diagrams of determining a second time unit according to an embodiment of this application.

In a scenario in which the length of the first time unit is greater than the length of the second time unit, because k1 represents the quantity of second time units from the first time unit to the second time unit, when the length of the first time unit is greater than or equal to twice or more than twice the length of the second time unit, if k1 is equal to 0, there may be a problem that a second time unit in which the feedback information corresponding to the downlink data is sent to the network device cannot be determined, and a transmission failure and a resource waste caused by an inconsistent understanding between the network device and the terminal device occur. For example, as shown in FIG. 3A, it is assumed that the length of the first time unit is equal to one slot, the length of the second time unit is equal to ½ slot, and the downlink data D1 occupies the second to the fourth symbols, which are three symbols in total, in a first time unit including two second time units numbered n−10 and n−9. When k1=0, starting from the first time unit in which the downlink data D1 is located, there are two ½ slots numbered n−10 and n−9 corresponding to k1=0. Therefore, in this scenario, a second time unit in which feedback information corresponding to the downlink data D1 is to be sent to the network device needs to be determined. It should be noted that, in FIG. 3A, n−10, n−9, and the like all represent numbers of second time units. Therefore, for example, when the length of the first time unit is greater than the length of the second time unit, and k1 is equal to 0, the determined second time unit is the last second time unit in a third time unit, and the third time unit is a first time unit whose number is the same as that of the first time unit for receiving the downlink data. FIG. 3A is used as an example. The first time unit for receiving downlink data is a slot including two ½ slots numbered n−10 and n−9, and the third time unit is an uplink slot corresponding to the slot including the two ½ slots numbered n−10 and n−9. In this case, the second time unit is determined to be the last second time unit in the third time unit, that is, the second time unit is the ½ slot numbered n−9, that is, the feedback information corresponding to the downlink data D1 needs to be sent to the network device in the ½ slot numbered n−9. In other words, the ½ slot numbered n−9 is the second time unit that is determined in step 202 and in which the feedback information corresponding to the downlink data D1 is located.

It should be noted that, in FIG. 3A, numbers that are of time units of a UL and a DL and that correspond to a same time segment are the same, and the numbers are accumulated by a step of 1 over time.

It should be noted that the accompanying drawings in the embodiments of this application are drawn by using an example in which a communications system is a frequency division duplexing (FDD) system, and the embodiments of this application may also be used in a time division duplexing (TDD) system.

It should be noted that when the length of the first time unit is greater than the length of the second time unit, and k1 is greater than 0, the determined second time unit is a k1$^{th}$ second time unit starting from the first time unit. It is assumed that the length of the first time unit is equal to one slot, the length of the second time unit is equal to ½ slot, and the downlink data D1 occupies the second to the fourth symbols, which are three symbols in total, in the first time unit including the two second time units numbered n−10 and n−9. When k1=1, starting from the first time unit in which the downlink data D1 is located, there is one ½ slot numbered n−8 corresponding to k1=1. Therefore, the feedback information corresponding to the downlink data D1 needs to be sent to the network device in the ½ slot numbered n−8. In other words, the ½ slot numbered n−8 is the second time unit that is determined in step 202 and in which the feedback information corresponding to the downlink data D1 is located.

Figure 3B:
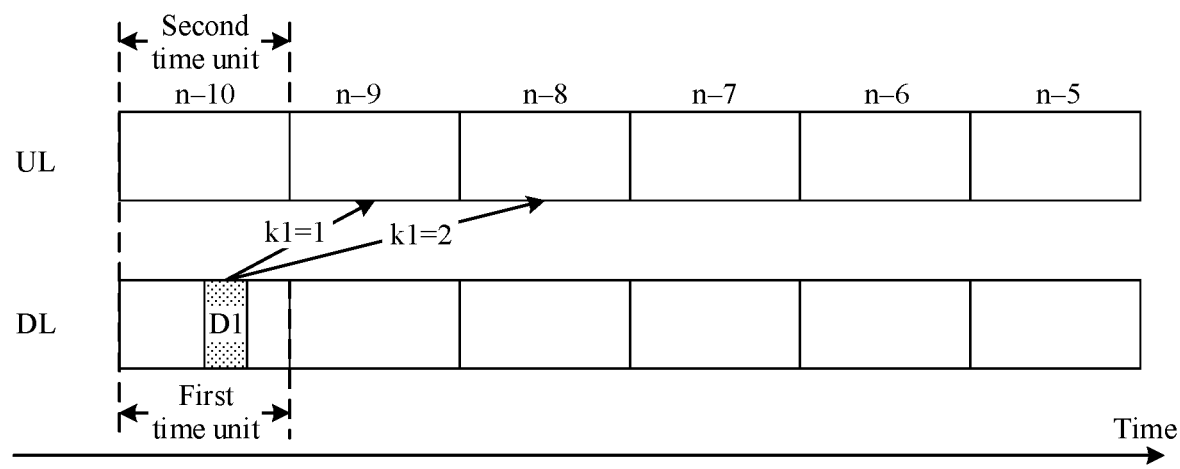

For example, the length of the first time unit may be equal to the length of the second time unit. As shown in FIG. 3B, it is assumed that both the length of the first time unit and the length of the second time unit are equal to ½ slot, and the downlink data D1 occupies the second to the fourth symbols, which are three symbols in total, in the ½ slot numbered n−10. When k1=1, starting from the first time unit in which the downlink data D1 is located, one ½ slot numbered n−9 corresponds to k1=1. Therefore, the feedback information corresponding to the downlink data D1 needs to be sent to the network device in the ½ slot numbered n−9. In other words, the ½ slot numbered n−9 is the second time unit that is determined in step 202 and in which the feedback information corresponding to the downlink data D1 is located. When k1=2, starting from the first time unit in which the downlink data D1 is located, one ½ slot numbered n−8 corresponds to k1=2. Therefore, the feedback information corresponding to the downlink data D1 needs to be sent to the network device in the ½ slot numbered n−8. In other words, the ½ slot numbered n−8 is the second time unit that is determined in step 202 and in which the feedback information corresponding to the downlink data D1 is located.

It should be noted that, in FIG. 3B, numbers that are of time units of a UL and a DL and that correspond to a same time segment are the same, and the numbers are accumulated by a step of 1 over time.

k1 may be indicated by the network device to the terminal device. For example, the network device may indicate k1 by using downlink control information (DCI) used for downlink data scheduling. There are two formats of the DCI: DCI format 1_0 and DCI format 1_1.

(1) For the DCI format 1_0, a k1 set may be specified, for example, {1, 2, 3, 4, 5, 6, 7, 8}, where the DCI format 1_0 includes three bits, and a value in the set is indicated by using the DCI format 1_0 to be a value of k1.

(2) For the DCI format 1_1, the network device may configure a k1 set by using higher layer signaling, where a quantity of k1 in the set is P, a quantity of bits included in the DCI format 1_1 depends on a value of P. If P is 4, two bits are included and a value in the configured set is indicated to be a value of k1. The higher layer signaling herein may be signaling sent from a higher-layer protocol layer, and the higher-layer protocol layer may include at least one protocol layer above a physical layer. For example, the higher-layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

It should be noted that, in this embodiment of this application, the k1 set is a set of at least one value of k1.

At step 203, the terminal device determines the first time unit for receiving the downlink data.

In this step, when receiving one piece of downlink data, the terminal device may determine the first time unit for receiving the downlink data. It should be noted that a specific manner of the terminal device to determine the first time unit for receiving the downlink data is not limited in this application.

At step 204, the terminal device determines, based on k1 corresponding to the downlink data, the second time unit in which the feedback information corresponding to the downlink data is located.

In this step, a specific manner of the terminal device to determine, based on k1 corresponding to the downlink data, the second time unit in which the feedback information corresponding to the downlink data is located is the same as a specific manner of the network device to determine, based on k1 corresponding to the downlink data, the second time unit in which the feedback information corresponding to the downlink data is located in step 204. Details are not described herein again.

At step 205, the terminal device sends, in the second time unit, a feedback codebook to the network device, where the feedback codebook includes the feedback information corresponding to the downlink data.

In this step, the feedback codebook may be, for example, a hybrid automatic repeat request acknowledgment (HARQ-ACK) codebook. The feedback codebook may include feedback information of all downlink data that needs to be sent to the network device in the second time unit. All the downlink data includes the downlink data sent to the terminal device in step 201, and may further include other downlink data sent to the terminal device. All the downlink data may be determined based on a specific codebook mode.

Figure 4:
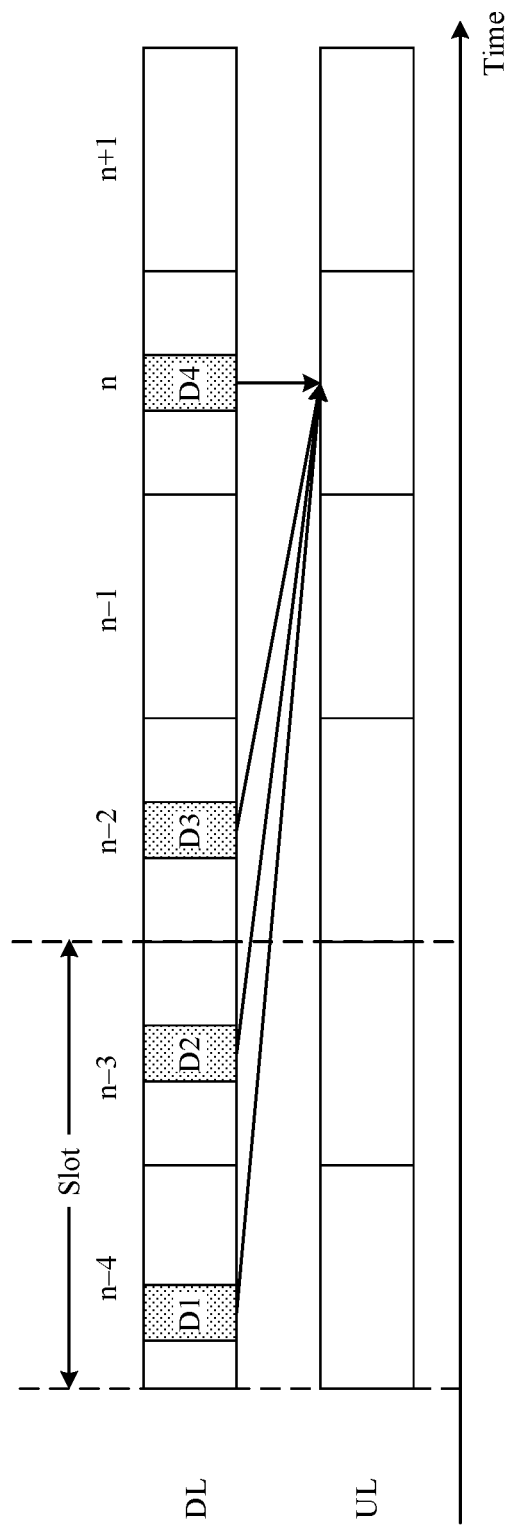

For example, the codebook mode is a dynamic codebook mode. The feedback information included in the feedback codebook may be determined based on k1 corresponding to the downlink data. For example, the length of the first time unit is one slot, and the length of the second time unit is ½ slot. As shown in FIG. 4, it is assumed that second time units determined based on k1 respectively corresponding to downlink data D1 to D4 are all a second time unit numbered n. In this case, a feedback codebook sent by user equipment to the network device in a second time unit numbered n includes feedback information respectively corresponding to the downlink data D1 to D4. Further, it is assumed that each piece of feedback information is 1 bit. In this case, a 4-bit feedback codebook may be generated, and each piece of feedback information occupies 1 bit.

It should be noted that, in FIG. 4, n−4, n−3, and the like represent numbers of second time units, numbers that are of time units of a UL and a DL and that correspond to a same time segment are the same, and the numbers are accumulated by a step of 1 over time.

For example, the codebook mode is a semi-persistent codebook mode. The feedback information included in the feedback codebook may be determined based on a k1 set. Specifically, the terminal device may determine, based on the k1 set, all ACKs/NACKs that may be fed back in the second time unit numbered n.

Figure 5:
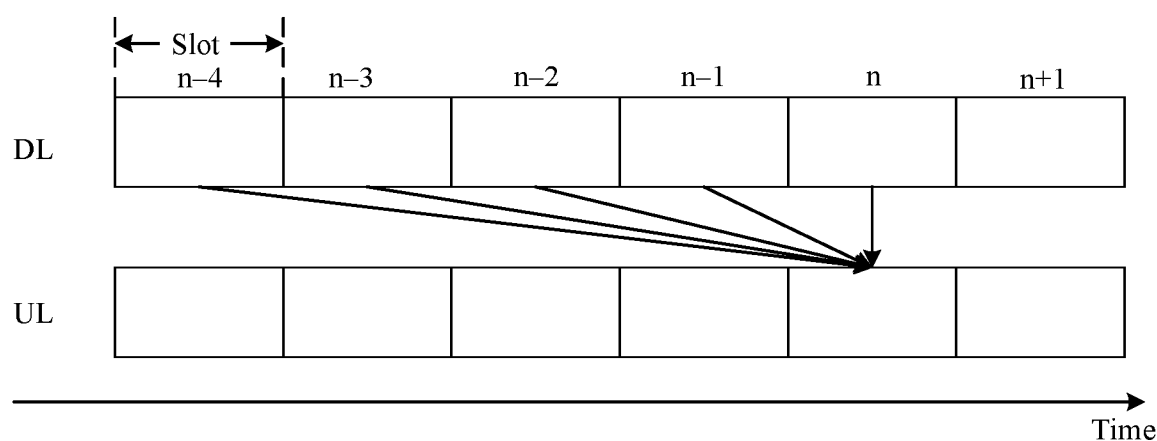
FIG. 5 is a schematic diagram of a semi-persistent codebook mode in the prior art.

In the prior art, for the semi-persistent codebook mode, an example in which the k1 set is {0, 1, 2, 3, 4} is used. As shown in FIG. 5, for all downlink data transmitted in slots numbered n−4, n−3, n−2, n−1, and n, ACKs/NACKs may be fed back and sent to the network device in the slot numbered n. Further, if k1 indicated by one piece of DCI is received in the slots numbered n−4, n−3, n−2, n−1, and n, and indicates that feedback information is sent in the slot numbered n, all feedback information in the slots numbered n−4, n−3, n−2, n−1, and n needs to be fed back. If no scheduling is performed in these slots, a NACK is filled in.

It should be noted that, in FIG. 5, numbers that are of time units of a UL and a DL and that correspond to a same time segment are the same, and the numbers are accumulated by a step of 1 over time.

In addition, a quantity of bits fed back in each slot may be determined in the following manner:

First, the network device sends configuration information to the terminal device, where the configuration information is used to indicate, to the terminal device, all time domain resources used by the terminal device to receive the downlink data.

Figure 6:
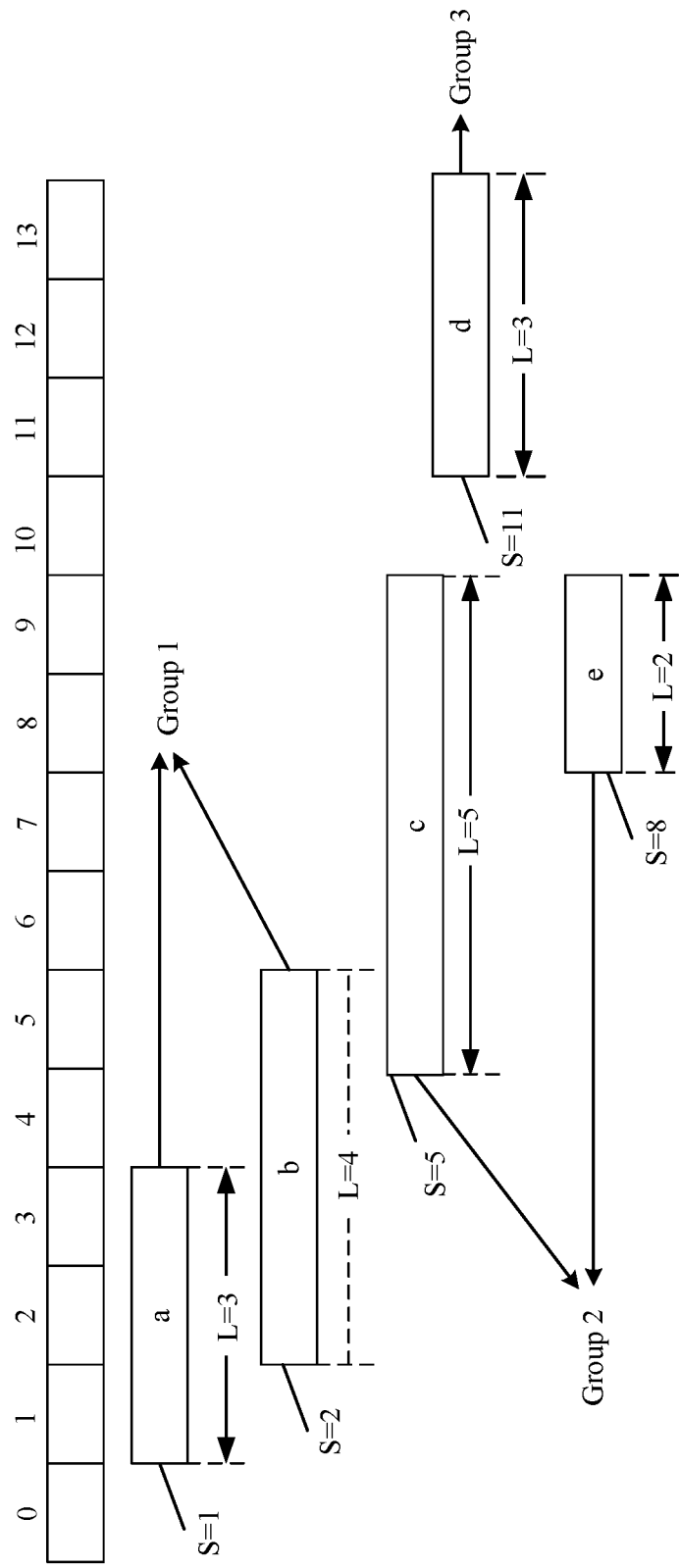
FIG. 6 is a schematic diagram of a configured time domain resource used by a terminal device to receive downlink data according to an embodiment of this application.

For example, the configuration information may be specifically a time domain resource table. Each row in the table indicates a start symbol S and a quantity L of symbols in one time domain resource, where S is used to indicate a start location of a symbol occupied by the downlink data in one slot, and L indicates a quantity of time domain symbols occupied by the downlink data in one slot counting from the start symbol S. For example, the table includes five rows, and one slot includes 14 symbols. Corresponding five time domain resources may be as shown in FIG. 6. FIG. 6 may represent that the network device configures, for the terminal device, five time domain resources used by the terminal device to receive the downlink data, which are respectively a time domain resource a including a symbol 1 to a symbol 3 in one slot, a time domain resource b including a symbol 2 to a symbol 5 in one slot, a time domain resource c including a symbol 5 to a symbol 9 in one slot, a time domain resource d including a symbol 11 to a symbol 13 in one slot, and a time domain resource e including a symbol 8 and a symbol 9 in one slot.

Both the network device and the terminal device may then determine, based on all the time domain resources that are configured for the terminal device and that are used by the terminal device to receive the downlink data, the quantity of bits fed back in each slot. Specifically, in one slot, first, starting from one time domain resource (which may be denoted as a time domain resource 1) at an earliest time, whether there is a time domain resource (which may be denoted as a time domain resource 2) that overlaps a range of the time domain resource in remaining time domain resources may be determined. If there is a time domain resource 2, the time domain resource 1 and the time domain resource 2 are grouped into one group (which may be denoted as a group 1, and it should be noted that there may be a plurality of time domain resources grouped with the time domain resource 1); or if there is no time domain resource 2, the time domain resource 1 is grouped into one group. Then, in remaining time domain resources obtained after the time domain resources that belong to the group 1 are removed, similarly, starting from one time domain resource (which may be denoted as a time domain resource 3) at an earliest time, whether there is a time domain resource (which may be denoted as a time domain resource 4) that overlaps a range of the time domain resource in remaining time domain resources is determined. If there is a time domain resource 4, the time domain resource 3 and the time domain resource 4 are grouped into one group; or if there is no time domain resource 4, the time domain resource 3 is grouped into one group (which may be denoted as a group 2). Then, in remaining time domain resources obtained after the time domain resources that belong to the group 1 and the group 2 are removed, similarly, . . . , until all the time domain resources are grouped. Because time domain resources in a same group partially or completely overlap each other in time domain, and generally, one time domain resource can be used by the terminal device to receive the downlink data at a same moment, one bit corresponding to one group is sufficient to send the feedback information corresponding to the downlink data to the network device. In this embodiment of this application, one group may correspond to one candidate occasion, one candidate occasion may correspond to one symbol range, the symbol range corresponds to one or more symbols occupied by one or more time domain resources in the group, and one candidate occasion may correspond to one piece of feedback information.

For example, in FIG. 6, the time domain resource a and the time domain resource b may be grouped into a group 1, the time domain resource c and the time domain resource e may be grouped into a group 2, and the time domain resource d may be grouped into a group 3. Therefore, for all the time domain resources that are used by the terminal device to receive the downlink data and that are shown in FIG. 6, three bits are fed back in each slot. In addition, in FIG. 6, a symbol range of a candidate occasion corresponding to the group 1 is a symbol 1 to a symbol 5, a symbol range of a candidate occasion corresponding to the group 2 is a symbol 5 to a symbol 9, and a symbol range of a candidate occasion corresponding to the group 3 is a symbol 11 to a symbol 13.

In addition, it may be learned that when the network device configures, for the terminal device in one slot, all the time domain resources used by the terminal device to receive the downlink data, and a timing relationship between when the downlink data is received by the terminal device and when the feedback information is sent by the terminal device to the network device satisfies n+k1, where n represents a slot in which the terminal device receives the downlink data, and k1 represents a quantity of slots between the slot in which the terminal device receives the downlink data and a slot in which the terminal device sends the feedback information corresponding to the downlink data, for candidate occasions of the terminal device configured based on the configuration information, symbol ranges of the candidate occasions are each fully covered in one slot.

Figure 7:
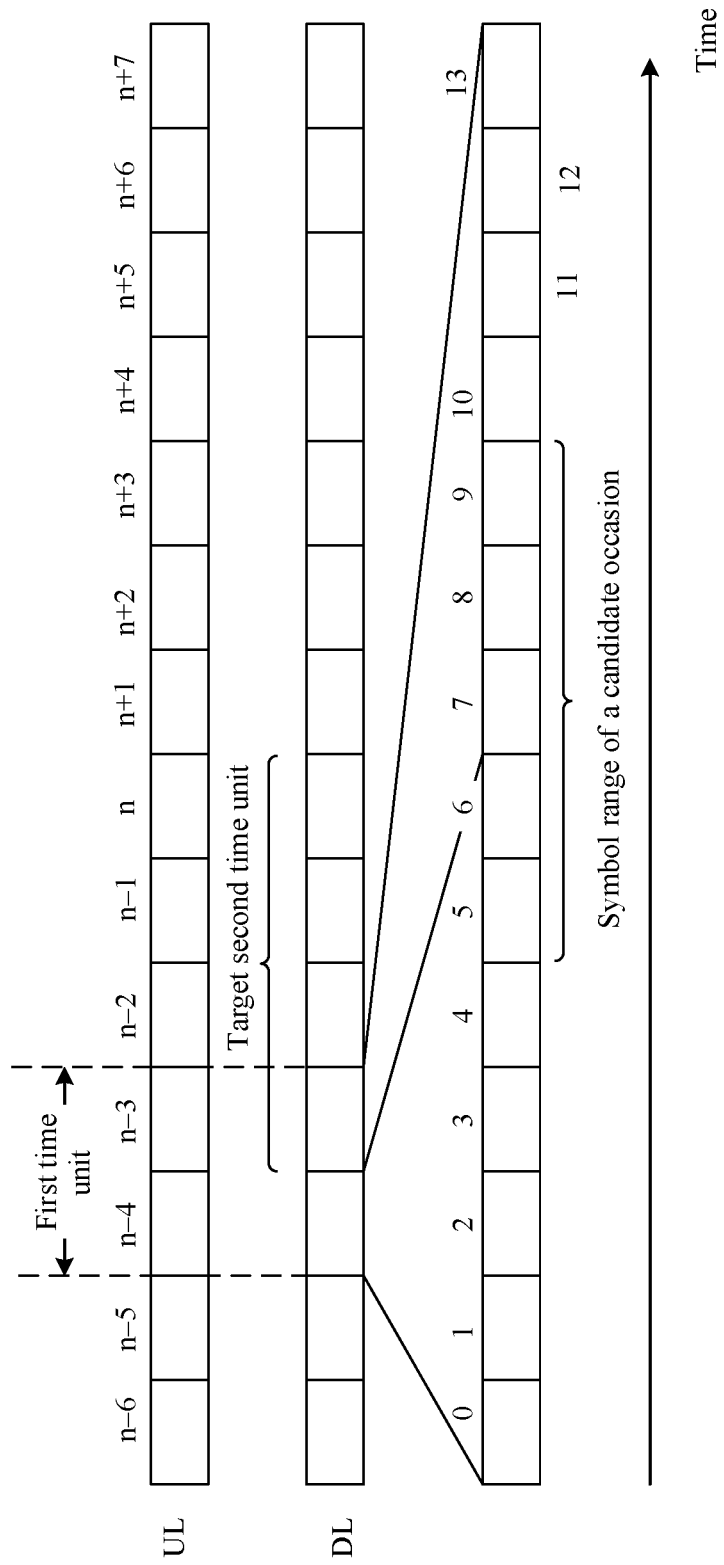
FIG. 7 is a schematic diagram of a symbol range of a candidate occasion not fully covered in one second time unit according to an embodiment of this application.

However, in this embodiment of this application, the length of the second time unit is less than one slot. When the network device configures, for the terminal device, all the time domain resources that are in a time unit greater than the second time unit (denoted as a fourth time unit below) and that are used by the terminal device to receive the downlink data, because in this embodiment of this application, the length of the second time unit is less than the length of the first time unit, and k1 represents a quantity of time units from the first time unit to the second time unit, there may be a second time unit that includes some symbols of one candidate occasion and that is in a target second time unit determined based on k1 and the determined second time unit. In other words, a symbol range of a candidate occasion is not fully covered in one second time unit. The target second time unit is a set of second time units that is determined based on k2 and the determined second time unit. Specifically, it is assumed that the determined second time unit is the second time unit numbered n, the length of the fourth time unit is one slot, and the k1 set is {0, 1, 2, 3}. In this case, the target second time unit may be as shown in FIG. 7. In FIG. 7, the target second time unit may be ½ slots numbered n, n−1, n−2, and n−3. Further, based on FIG. 6, it may be determined that some symbols of the candidate occasion corresponding to the group 3 are in a second time unit numbered n−4, and the other symbols are in a second time unit numbered n−3, (the symbol range of the candidate occasion corresponding to the group 3 is the symbol 11 to the symbol 13). In this case, it needs to be determined whether feedback information corresponding to the candidate occasion corresponding to the group 3 is to be included in the feedback codebook of the determined second time unit. In other words, in this embodiment of this application, when a symbol range of a candidate occasion is not fully covered in one second time unit, how to determine a quantity of bits of a feedback codebook sent in one second time unit needs to be considered.

It should be noted that, in FIG. 7, numbers that are of time units of a UL and a DL and that correspond to a same time segment are the same, and the numbers are accumulated by a step of 1 over time. Numbers 0 to 13 represent numbers of symbols in one slot.

For example, the quantity of bits of the feedback codebook sent in one second time unit may be determined in any one of the following three manners.

Manner 1:

When the length of the first time unit is equal to the length of the fourth time unit, the feedback codebook includes feedback information corresponding to a candidate occasion of a target first time unit, and the candidate occasion is used by the terminal device to receive the downlink data.

The target first time unit is a set of first time units in which the target second time unit is located, the length of the first time unit is greater than the length of the second time unit, and the target first time unit includes the first time unit for receiving the downlink data; and the target second time unit is the set of second time units that is determined based on the k1 set and the second time unit in which the feedback information corresponding to the downlink data is located, and the k1 set is a set of at least one value of k1.

Figure 8:
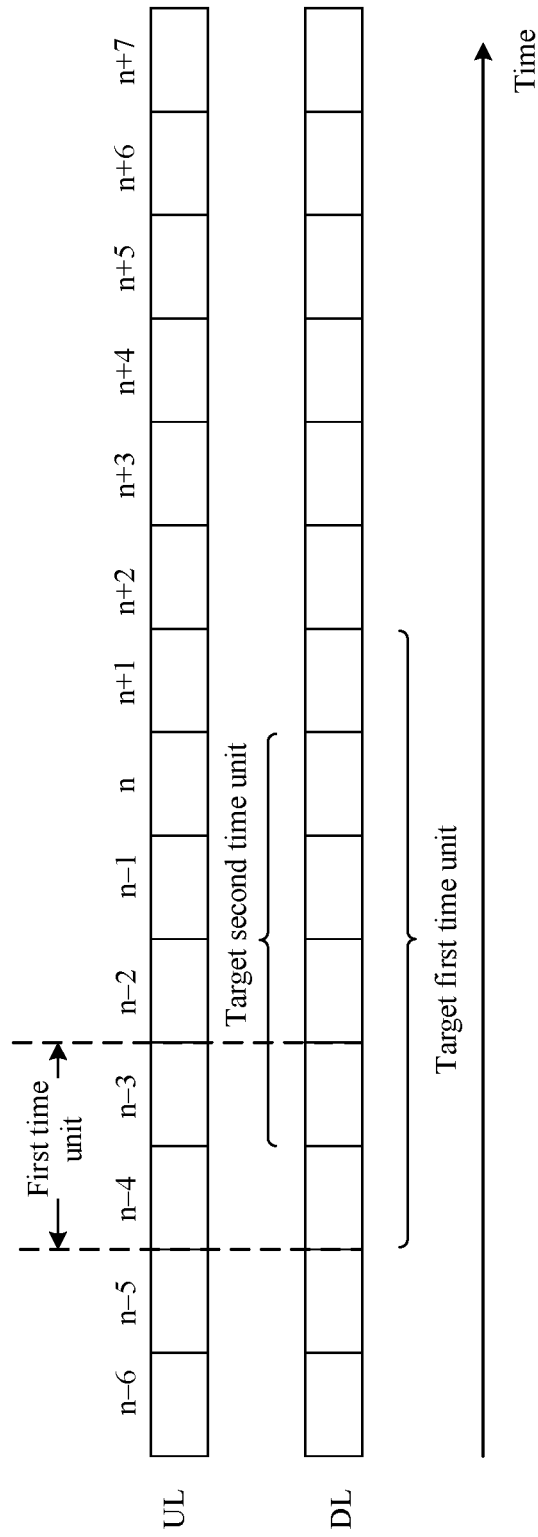
FIG. 8 is a schematic diagram of a target first time unit and a target second time unit according to an embodiment of this application.

For example, it is assumed that both the length of the first time unit and the length of the fourth time unit are one slot, and the length of the second time unit is ½ slot, the determined second time unit is the second time unit numbered n, and the k1 set is {0, 1, 2, 3}. In this case, the target second time unit and the target first time unit may be as shown in FIG. 8. In FIG. 8, the second time unit in which the feedback information corresponding to the downlink data is located is the ½ slot numbered n. With reference to the k1 set, it may be determined that a set of the ½ slots numbered n−3, n−2, n−1, and n is the target second time unit. Slots in which the ½ slots are located include a slot in which ½ slots numbered n−4 and n−3 are located, a slot in which the ½ slots numbered n−2 and n−1 are located, and a slot in which ½ slots numbered n and n+1 are located. A set of the three slots is the target first time unit. In other words, the feedback codebook includes feedback information of all candidate occasions in the three slots.

When the length of the first time unit is not equal to the length of the fourth time unit, the feedback codebook includes feedback information corresponding to a candidate occasion of a target fourth time unit, and the candidate occasion is used by the terminal device to receive the downlink data.

The target fourth time unit is a set of fourth time units in which the target second time unit is located, the length of the fourth time unit is greater than the length of the second time unit, and the target fourth time unit includes the candidate occasion for receiving the downlink data; and the target second time unit is the set of second time units that is determined based on the k1 set and the second time unit in which the feedback information corresponding to the downlink data is located, and the k1 set is the set of at least one value of k1.

Figure 9:
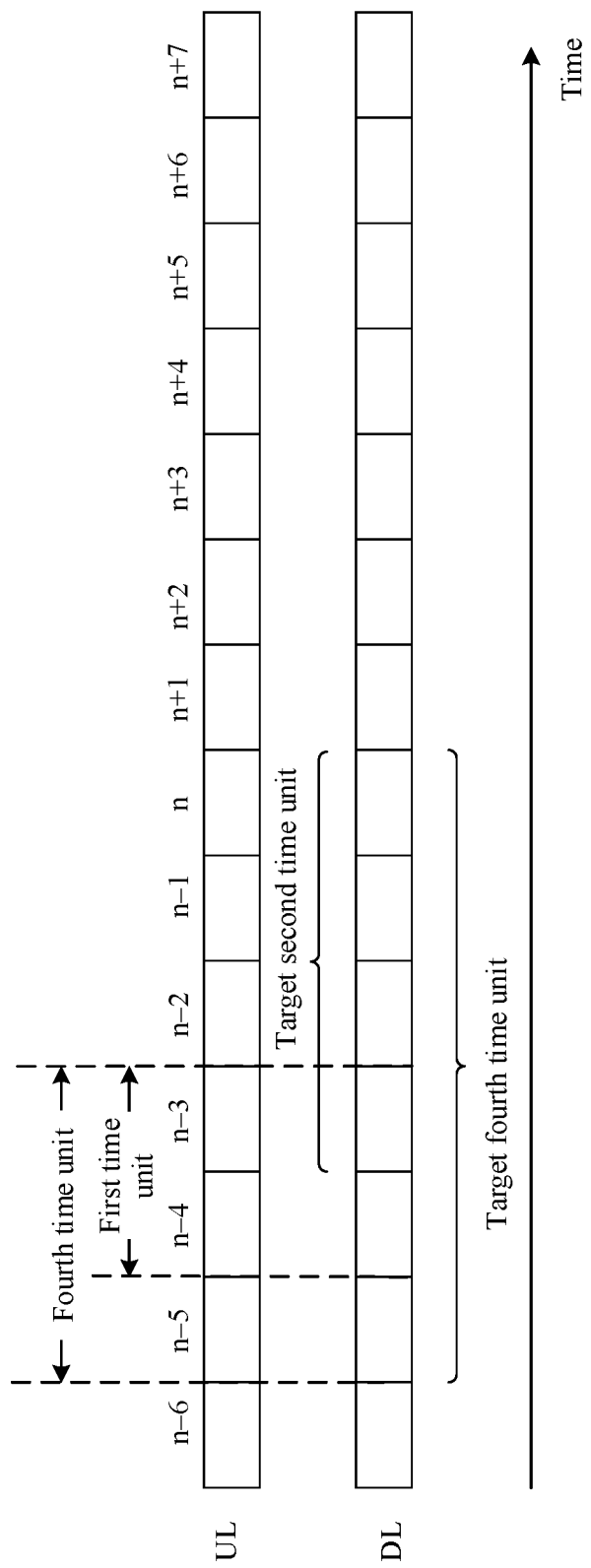
FIG. 9 is a schematic diagram of a target second time unit and a target fourth time unit according to an embodiment of this application.

For another example, it is assumed that the length of the first time unit is one slot, and the length of the fourth time unit is 3/2 slots, the length of the second time unit is ½ slot, the determined second time unit is the second time unit numbered n, and the k1 set is {0, 1, 2, 3}. In this case, the target second time unit and the target fourth time unit may be as shown in FIG. 9. In FIG. 9, the second time unit in which the feedback information corresponding to the downlink data is located is the 1/2 slot numbered n. With reference to the k1 set, it may be determined that the set of the ½ slots numbered n−3, n−2, n−1, and n is the target second time unit. 3/2 slots in which the ½ slots are located may include 3/2 slots in which ½ slots numbered n−5, n−4, and n−3 are located and 3/2 slots in which the ½ slots numbered n−2, n−1, and n are located. A set of the two 3/2 slots is the target fourth time unit. In other words, the feedback codebook includes feedback information of all candidate occasions in the two 3/2 slots.

It can be learned that when the length of the fourth time unit is not equal to the length of the first time unit, although the downlink data is sent in the first time unit, because one candidate occasion is allocated to one fourth time unit, the feedback information included in the feedback codebook may not be related to the first time unit.

Manner 2:

The feedback codebook includes feedback information corresponding to a target candidate occasion, the target candidate occasion includes a candidate occasion in which the last symbol of the target fourth time unit belongs to the target second time unit, and/or a candidate occasion in which the first symbol of the target fourth time unit belongs to the target second time unit, the candidate occasion is used by the terminal device to receive the downlink data, and the target candidate occasion includes the candidate occasion for receiving the downlink data.

The target fourth time unit is the set of fourth time units in which the target second time unit is located, and the length of the fourth time unit is greater than the length of the second time unit; and the target second time unit is the set of second time units that is determined based on the k1 set and the second time unit in which the feedback information corresponding to the downlink data is located, and the k1 set is the set of at least one value of k1.

Figure 10A:
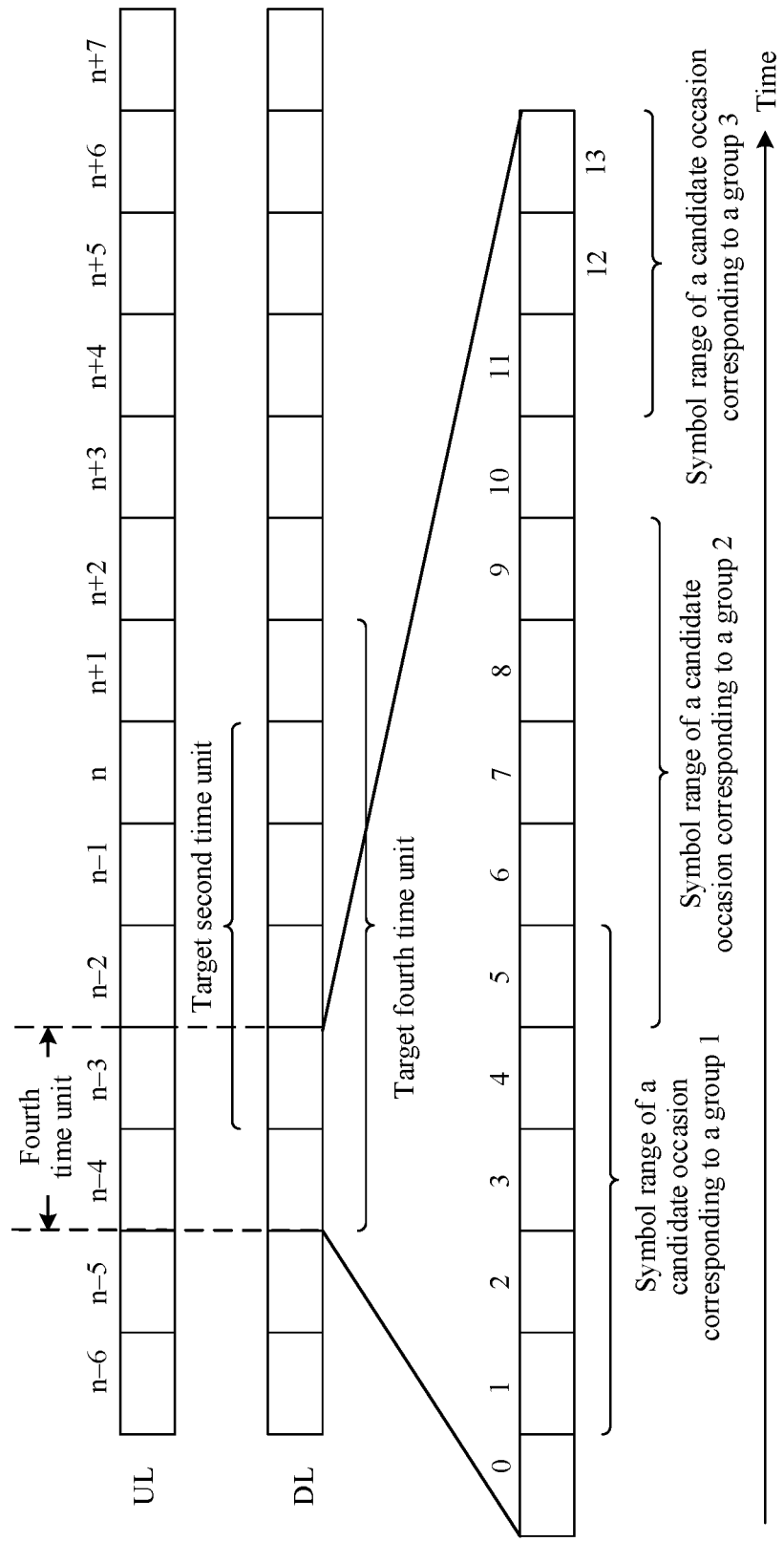
FIG. 10A to FIG. 10C are schematic diagrams of a target candidate occasion according to an embodiment of this application.
Figure 10B:
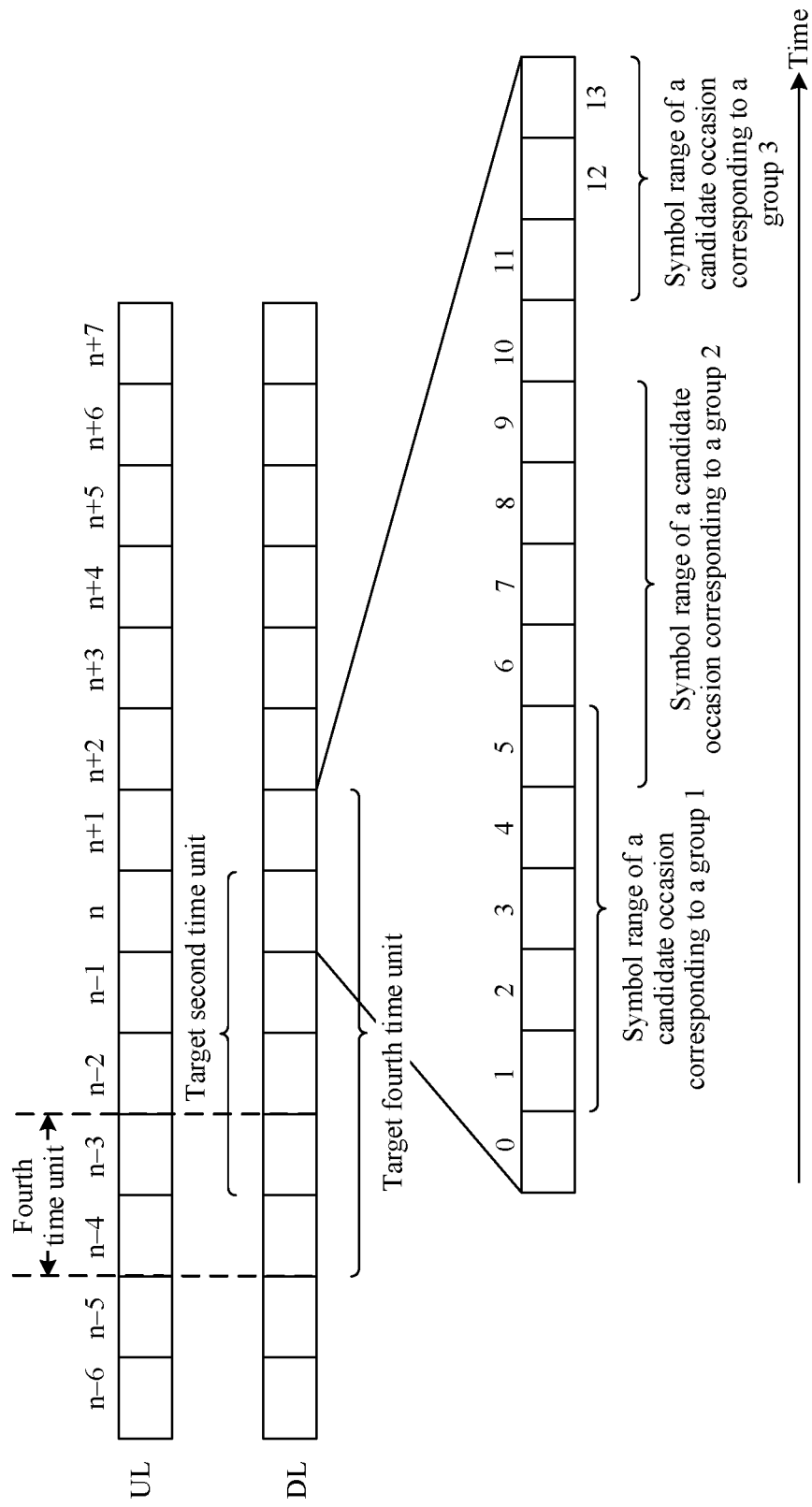
Figure 10C:
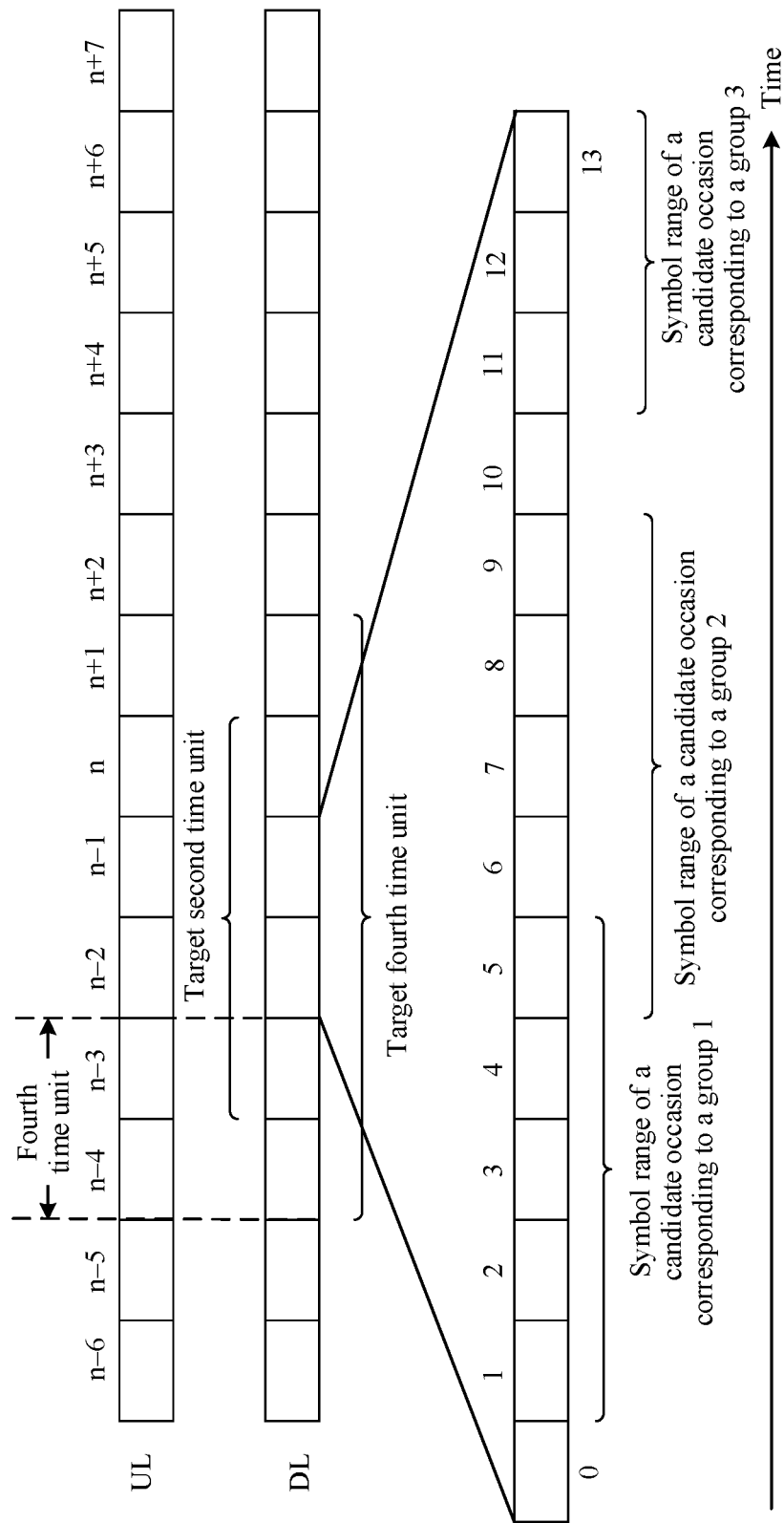

For example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6. In addition, the target candidate occasion includes a candidate occasion in which the last symbol in a symbol range of the target fourth time unit belongs to the target second time unit. In this case, a method for determining the target candidate occasion may be as shown in FIG. 10A to FIG. 10C. In FIG. 10A to FIG. 10C, the second time unit in which the feedback information corresponding to the downlink data is located is the ½ slot numbered n. With reference to the k1 set, it may be determined that the set of the ½ slots numbered n−3, n−2, n−1, and n is the target second time unit. The slots in which the ½ slots are located include the slot in which the ½ slots numbered n−4 and n−3 are located, the slot in which the ½ slots numbered n−2 and n−1 are located, and the slot in which the ½ slots numbered n+1 and n are located. The set of the three slots is the target fourth time unit. Specifically, as shown in FIG. 10A, there are three groups of candidate occasions in the slot in which the ½ slots numbered n−4 and n−3 are located. The last symbols in symbol ranges of candidate occasions corresponding to a group 2 and a group 3 belong to the ½ slot numbered n−3 (that is, belong to the target second time unit). Therefore, the feedback codebook includes feedback information corresponding to the candidate occasions that correspond to the group 2 and the group 3 and that are in the slot in which the ½ slots numbered n−4 and n−3 are located. As shown in FIG. 10B, there are three groups of candidate occasions in the slot in which the ½ slots numbered n+1 and n are located. The last symbol in a symbol range of a candidate occasion corresponding to a group 1 belongs to the ½ slot numbered n (that is, belongs to the target second time unit). Therefore, the feedback codebook includes feedback information corresponding to the candidate occasion that corresponds to the group 1 and that is in the slot in which the ½ slots numbered n+1 and n are located. As shown in FIG. 10C, in the slot in which the ½ slots numbered n−2 and n−1 are located, the last symbols of three groups of candidate occasions all belong to the ½ slots numbered n−2 and n−1 (that is, belong to the target second time unit). Therefore, the feedback codebook includes feedback information corresponding to all the candidate occasions in the slot in which the ½ slots numbered n−2 and n−1 are located.

For still another example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6. In addition, the target candidate occasion includes a candidate occasion in which the first symbol in the symbol range of the target fourth time unit belongs to the target second time unit. In this case, a method for determining the target candidate occasion may be as shown in FIG. 10A to FIG. 10C. In FIG. 10A to FIG. 10C, the second time unit in which the feedback information corresponding to the downlink data is located is the ½ slot numbered n. With reference to the k1 set, it may be determined that the set of the ½ slots numbered n−3, n−2, n−1, and n is the target second time unit. The slots in which the ½ slots are located include the slot in which the ½ slots numbered n−4 and n−3 are located, the slot in which the ½ slots numbered n−2 and n−1 are located, and the slot in which the ½ slots numbered n−1 and n are located. A set of the three slots is the target fourth time unit. Specifically, as shown in FIG. 10A, there are the three groups of the candidate occasions in the slot in which the ½ slots numbered n−4 and n−3 are located. The first symbol in the symbol range of the candidate occasion corresponding to the group 3 belongs to the ½ slot numbered n−3 (that is, belongs to the target second time unit). Therefore, the feedback codebook includes feedback information corresponding to the candidate occasion that corresponds to the group 3 and that is in the slot in which the ½ slot numbered n−3 is located. As shown in FIG. 10B, there are the three groups of the candidate occasions in the slot in which the ½ slots numbered n+1 and n are located. The first symbols in symbol ranges of candidate occasions corresponding to the group 1 and the group 2 belong to the ½ slot numbered n (that is, belong to the target second time unit). Therefore, the feedback codebook includes feedback information corresponding to the candidate occasions that correspond to the group 1 and the group 2 and that are in the slot in which the ½ slots numbered n+1 and n are located. As shown in FIG. 10C, in the slot in which the ½ slots numbered n−2 and n−1 are located, the first symbols of the three groups of the candidate occasions all belong to the ½ slots numbered n−2 and n−1 (that is, belong to the target second time unit). Therefore, the feedback codebook includes the feedback information corresponding to all the candidate occasions in the slot in which the ½ slots numbered n−2 and n−1 are located.

For still another example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6.

In addition, the target candidate occasion includes a candidate occasion in which the first symbol and the last symbol in the symbol range of the target fourth time unit belong to the target second time unit. In this case, the target candidate occasion may be as shown in FIG. 10A to FIG. 10C. In FIG. 10A to FIG. 10C, the second time unit in which the feedback information corresponding to the downlink data is located is the ½ slot numbered n. With reference to the k1 set, it may be determined that the set of the ½ slots numbered n−3, n−2, n−1, and n is the target second time unit. The slots in which the ½ slots are located include the slot in which the ½ slots numbered n−4 and n−3 are located, the slot in which the ½ slots numbered n−2 and n−1 are located, and the slot in which the ½ slots numbered n−1 and n are located. The set of the three slots is the target fourth time unit. Specifically, as shown in FIG. 10A, there are the three groups of the candidate occasions in the slot in which the ½ slots numbered n−4 and n−3 are located. The first symbol in the symbol range of the candidate occasion corresponding to the group 3 belongs to the ½ slot numbered n−3 (that is, belongs to the target second time unit). The last symbols in the symbol ranges of the candidate occasions corresponding to the group 2 and the group 3 belong to the ½ slot numbered n−3 (that is, belong to the target second time unit). Therefore, the feedback codebook includes feedback information corresponding to the candidate occasions that correspond to the group 2 and the group 3 and that are in the slot in which the ½ slot numbered n−3 is located. As shown in FIG. 10B, there are the three groups of the candidate occasions in the slot in which the ½ slots numbered n+1 and n are located. The first symbols in symbol ranges of candidate occasions corresponding to the group 1 and the group 2 belong to the ½ slot numbered n (that is, belong to the target second time unit). The last symbol in the symbol range of the candidate occasion corresponding to the group 1 belongs to the ½ slot numbered n (that is, belongs to the target second time unit). Therefore, the feedback codebook includes feedback information corresponding to the candidate occasions that correspond to the group 1 and the group 2 and that are in the slot in which the ½ slots numbered n+1 and n are located. As shown in FIG. 10C, in the slot in which the ½ slots numbered n−2 and n−1 are located, the first symbols and the last symbols of the three groups of the candidate occasions all belong to the ½ slots numbered n−2 and n−1 (that is, belong to the target second time unit). Therefore, the feedback codebook includes the feedback information corresponding to all the candidate occasions in the slot in which the ½ slots numbered n−2 and n−1 are located.

It should be noted that when the length of the fourth time unit is equal to one slot, in the foregoing Manner 1 and Manner 2, a manner of grouping time domain resources is the same as the foregoing grouping method for time domain resources configured in one slot. Details are not described herein again. When the length of the fourth time unit is not equal to one slot, a manner of grouping time domain resources may be similar to the foregoing grouping method for time domain resources configured in one slot. Specifically, the time domain resources are grouped in one slot above. Herein, the time domain resources may be grouped in one second time unit instead of in one slot.

For example, the length of the fourth time unit is one slot. The length of the fourth time unit is equal to one slot, so that a design can be simplified.

Manner 3:

The feedback codebook includes feedback information corresponding to the candidate occasion of the target second time unit, the candidate occasion is used by the terminal device to receive the downlink data, and the candidate occasion includes the candidate occasion for receiving the downlink data.

The target second time unit is the set of the second time units that is determined based on the k1 set and the second time unit in which the feedback information corresponding to the downlink data is located, and the k1 set is the set of at least one value of k1; and the candidate occasion is determined based on a part of all configured time domain resources used by the terminal device to receive the downlink data, where the part of time domain resources includes a time domain resource whose first symbol belongs to the target second time unit, and/or a time domain resource whose last symbol belongs to the target second time unit.

Figure 11A:
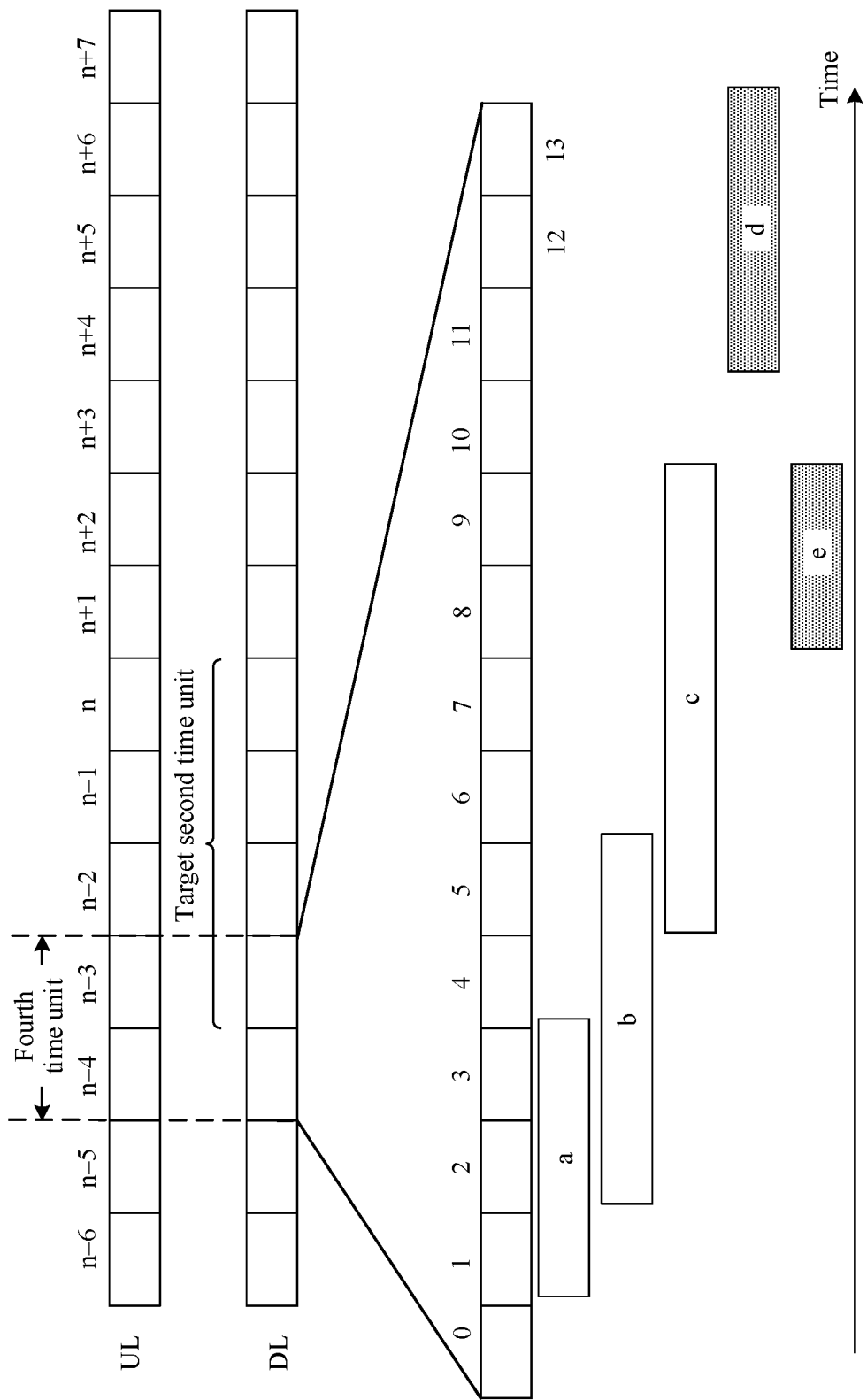
FIG. 11A to FIG. 13C are schematic diagrams of a part of time domain resources according to an embodiment of this application.
Figure 11B:
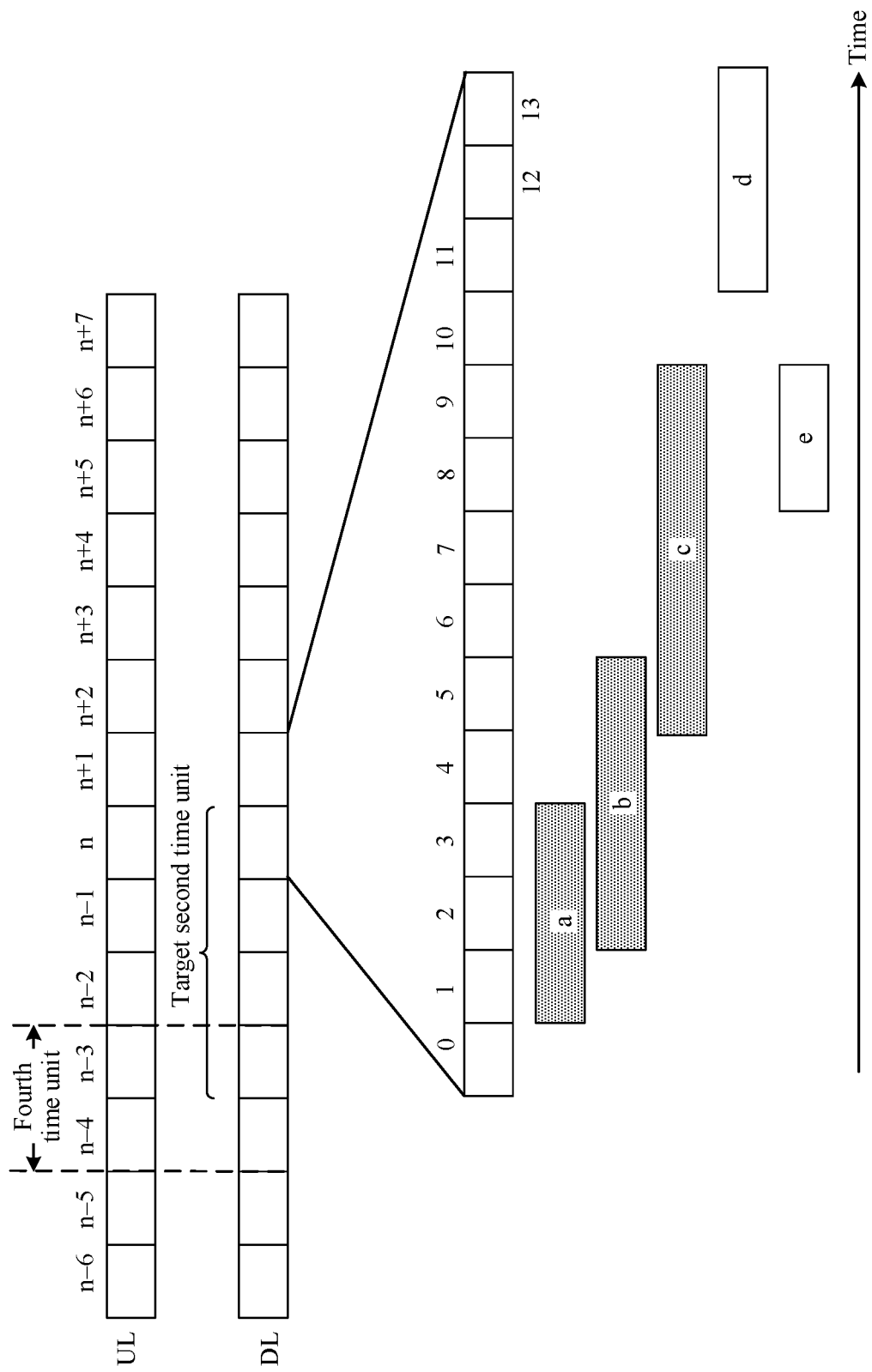
Figure 11C:
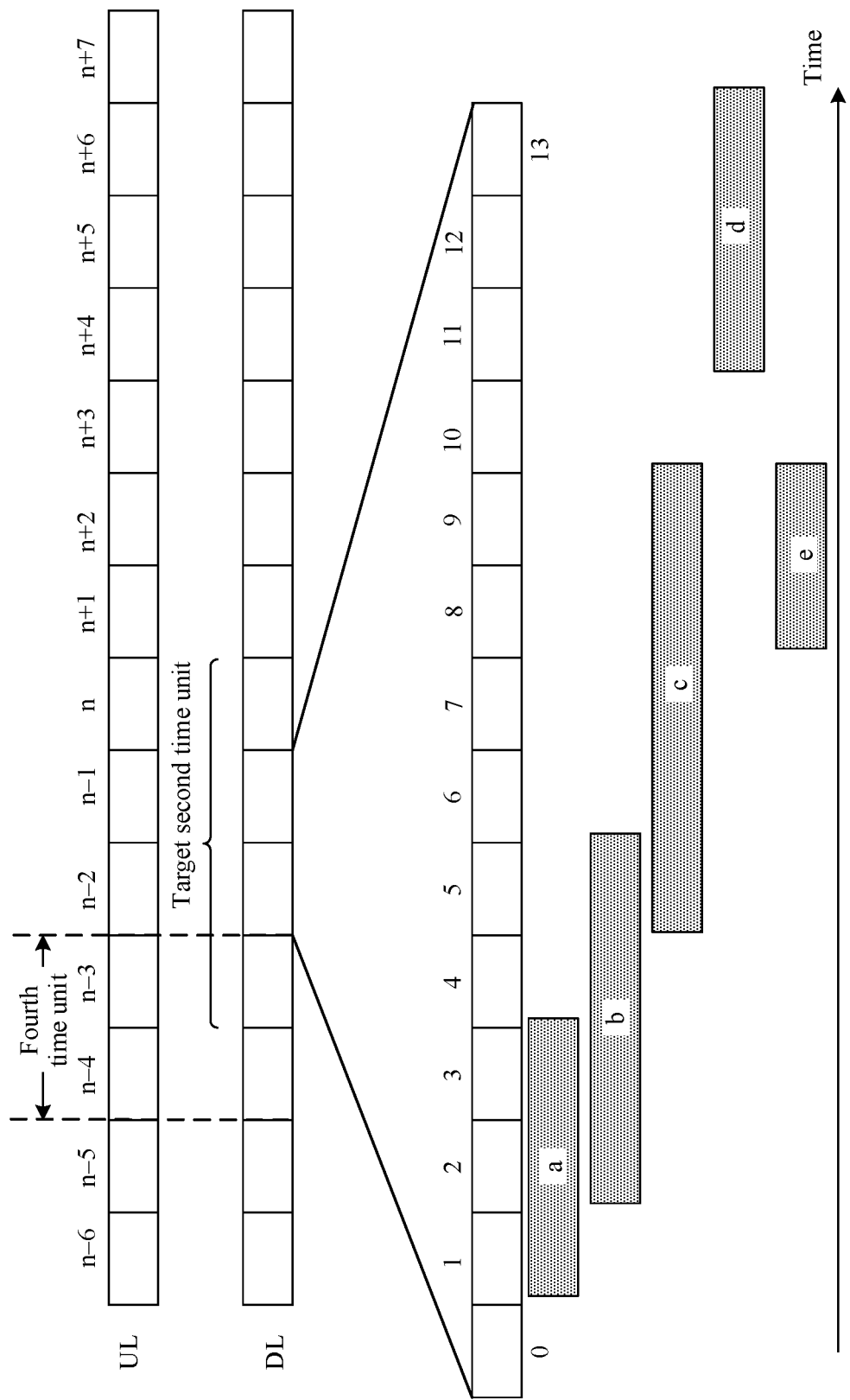

For example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6. In addition, the part of time domain resources includes the time domain resource whose first symbol belongs to the target second time unit. In this case, a method for determining the part of time domain resources may be as shown in FIG. 11A to FIG. 11C. In FIG. 11A to FIG. 11C, the second time unit in which the feedback information corresponding to the downlink data is located is the ½ slot numbered n. With reference to the k1 set, it may be determined that the set of the ½ slots numbered n−3, n−2, n−1, and n is the target second time unit. Specifically, as shown in FIG. 11A, the first symbols of a time domain resource d and a time domain resource e in five time domain resources in the slot in which the ½ slots numbered n−4 and n−3 are located belong to the ½ slot numbered n−3 (that is, belong to the target second time unit). Therefore, the part of time domain resources includes the time domain resources d and e in the slot in which the ½ slots numbered n−4 and n−3 are located, so that the feedback codebook includes feedback information of candidate occasions that correspond to the time domain resource d and the time domain resource e and that are in the slot in which the ½ slots numbered n−4 and n−3 are located. As shown in FIG. 11B, the first symbols of a time domain resource a, a time domain resource b, and a time domain resource c in five time domain resources in the slot in which the ½ slots numbered n+1 and n are located belong to the ½ slot numbered n (that is, belong to the target second time unit). Therefore, the part of time domain resources includes the time domain resources a, b, and c in the slot in which the ½ slots numbered n+1 and n are located, so that the feedback codebook includes feedback information of candidate occasions that correspond to the time domain resources a, b, and c and that are in the slot in which the ½ slots numbered n+1 and n are located. As shown in FIG. 11C, the first symbols of five time domain resources in the slot in which the ½ slots numbered n−2 and n−1 are located all belong to the slot in which the ½ slots numbered n−2 and n−1 are located (that is, belong to the target second time unit). Therefore, the part of time domain resources includes all time domain resources in the slot in which the ½ slots numbered n−2 and n−1 are located, so that the feedback codebook includes feedback information of candidate occasions that correspond to all the time domain resources and that are in the slot in which the ½ slots numbered n−2 and n−1 are located.

Figure 12A:
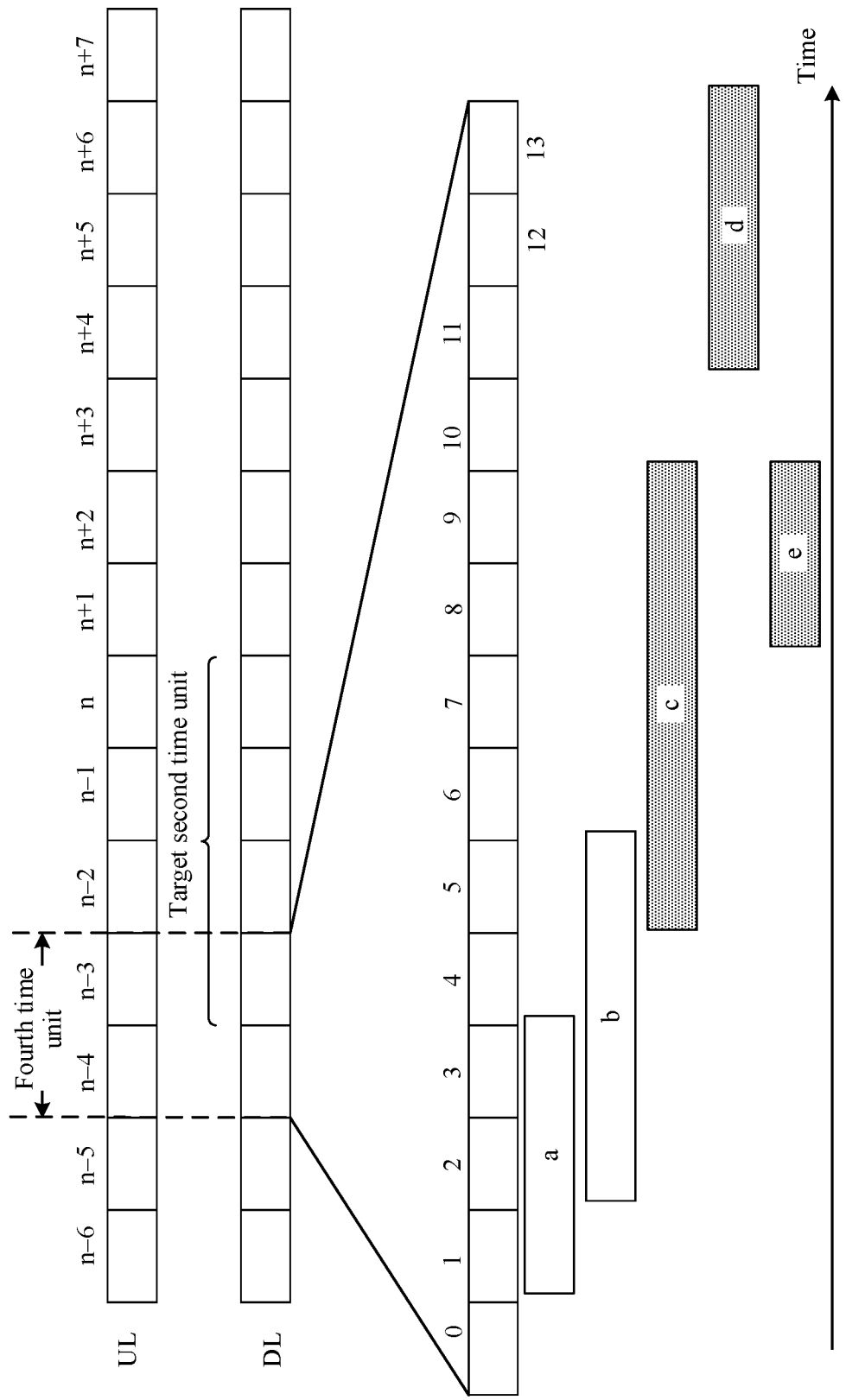
Figure 12B:
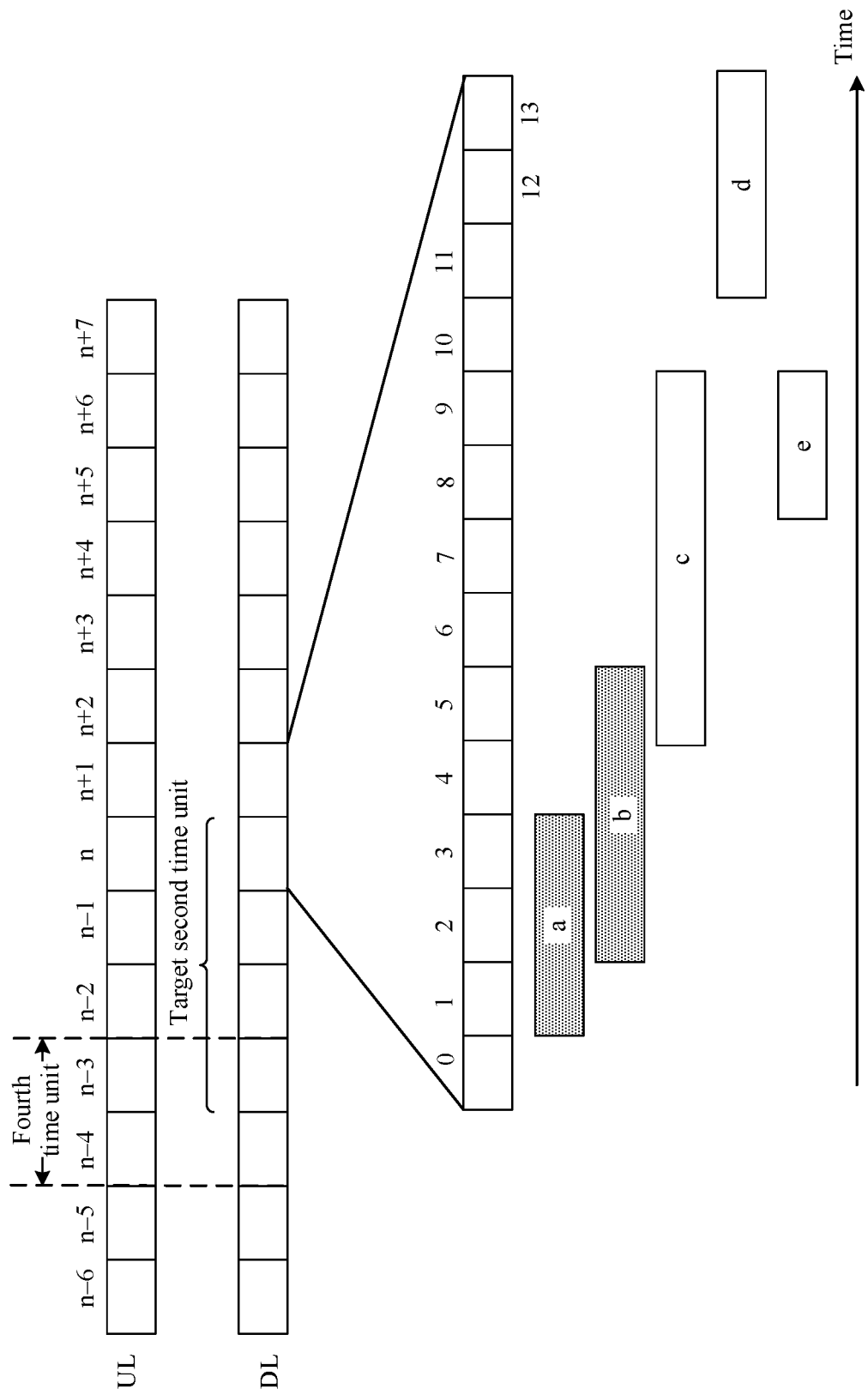
Figure 12C:
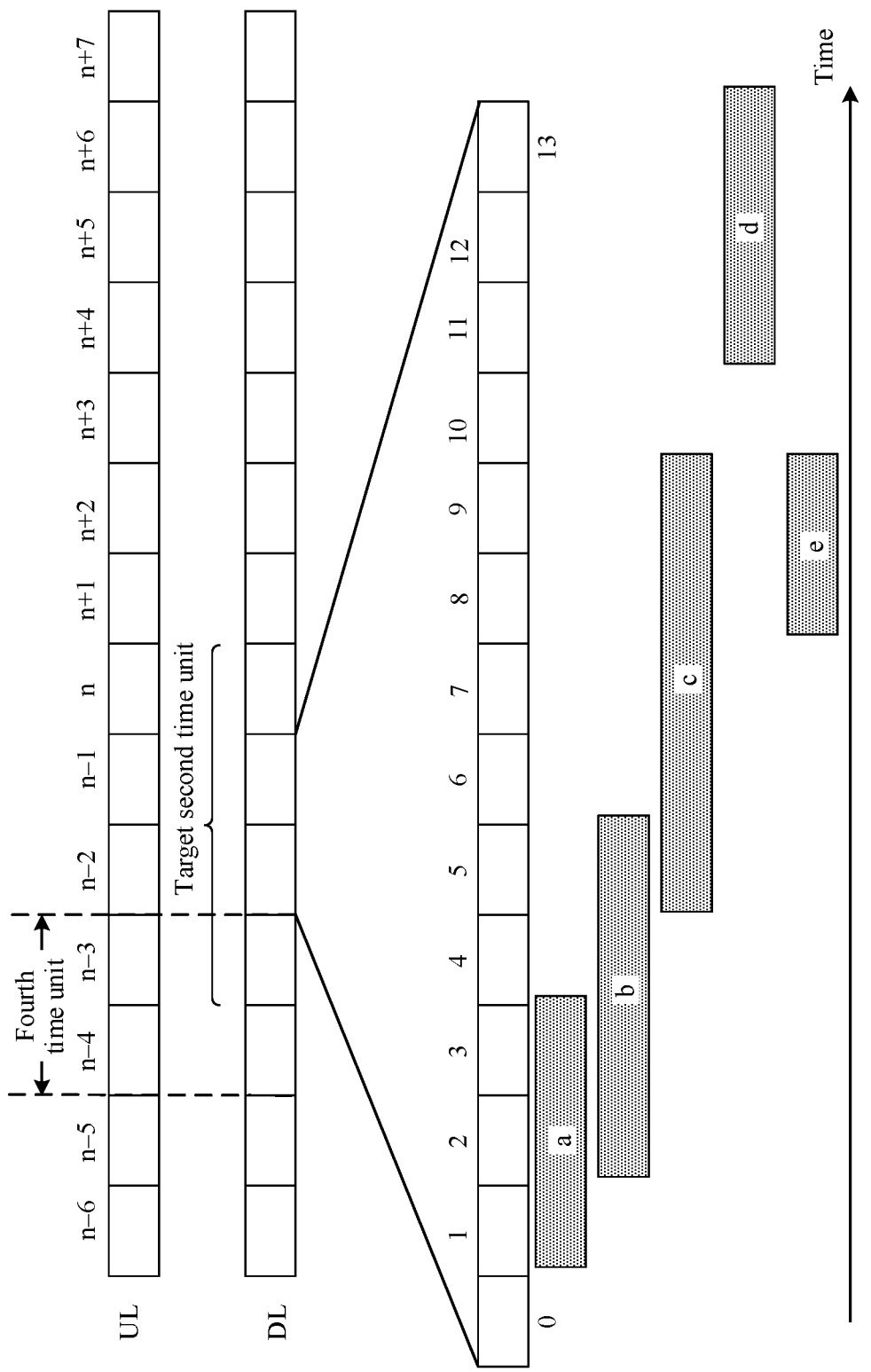

For another example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6. In addition, the part of time domain resources includes a time domain resource whose last symbol belongs to the target second time unit. In this case, a method for determining the part of time domain resources may be as shown in FIG. 12A to FIG. 12C. In FIG. 12A to FIG. 12C, the second time unit in which the feedback information corresponding to the downlink data is located is the ½ slot numbered n. With reference to the k1 set, it may be determined that the set of the ½ slots numbered n−3, n−2, n−1, and n is the target second time unit. Specifically, as shown in FIG. 12A, the last symbols of a time domain resource c, a time domain resource d, and a time domain resource e in five time domain resources in the slot in which the ½ slots numbered n−4 and n−3 are located belong to the ½ slot numbered n−3 (that is, belong to the target second time unit). Therefore, the part of time domain resources includes the time domain resources c, d, and e in the slot in which the ½ slots numbered n−4 and n−3 are located, so that the feedback codebook includes feedback information of candidate occasions that correspond to the time domain resources c, d, and e and that are in the slot in which the ½ slots numbered n−4 and n−3 are located. As shown in FIG. 12B, the last symbols of a time domain resource a and a time domain resource b in five time domain resources in the slot in which the ½ slots numbered n+1 and n are located belong to the ½ slot numbered n (that is, belong to the target second time unit). Therefore, the part of time domain resources includes the time domain resources a and b in the slot in which the ½ slots numbered n+1 and n are located, so that the feedback codebook includes feedback information of candidate occasions that correspond to the time domain resources a and b and that are in the slot in which the ½ slots numbered n+1 and n are located. As shown in FIG. 12C, the last symbols of five time domain resources in the slot in which the ½ slots numbered n−2 and n−1 are located all belong to the slot in which the ½ slots numbered n−2 and n−1 are located (that is, belong to the target second time unit). Therefore, the part of time domain resources includes all time domain resources in the slot in which the ½ slots numbered n−2 and n−1 are located, so that the feedback codebook includes feedback information of candidate occasions that correspond to all the time domain resources and that are in the slot in which the ½ slots numbered n−2 and n−1 are located.

Figure 13A:
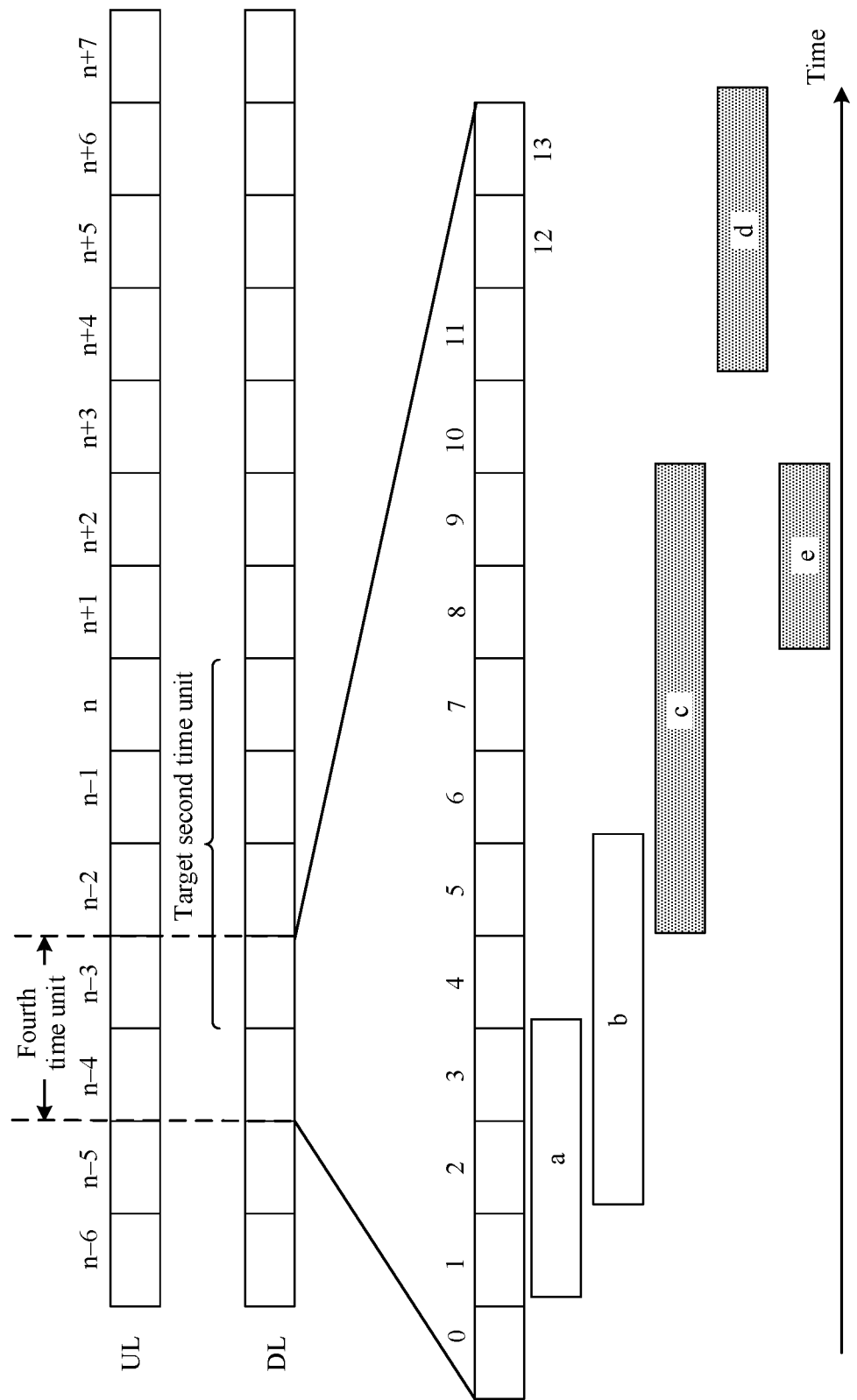
Figure 13B:
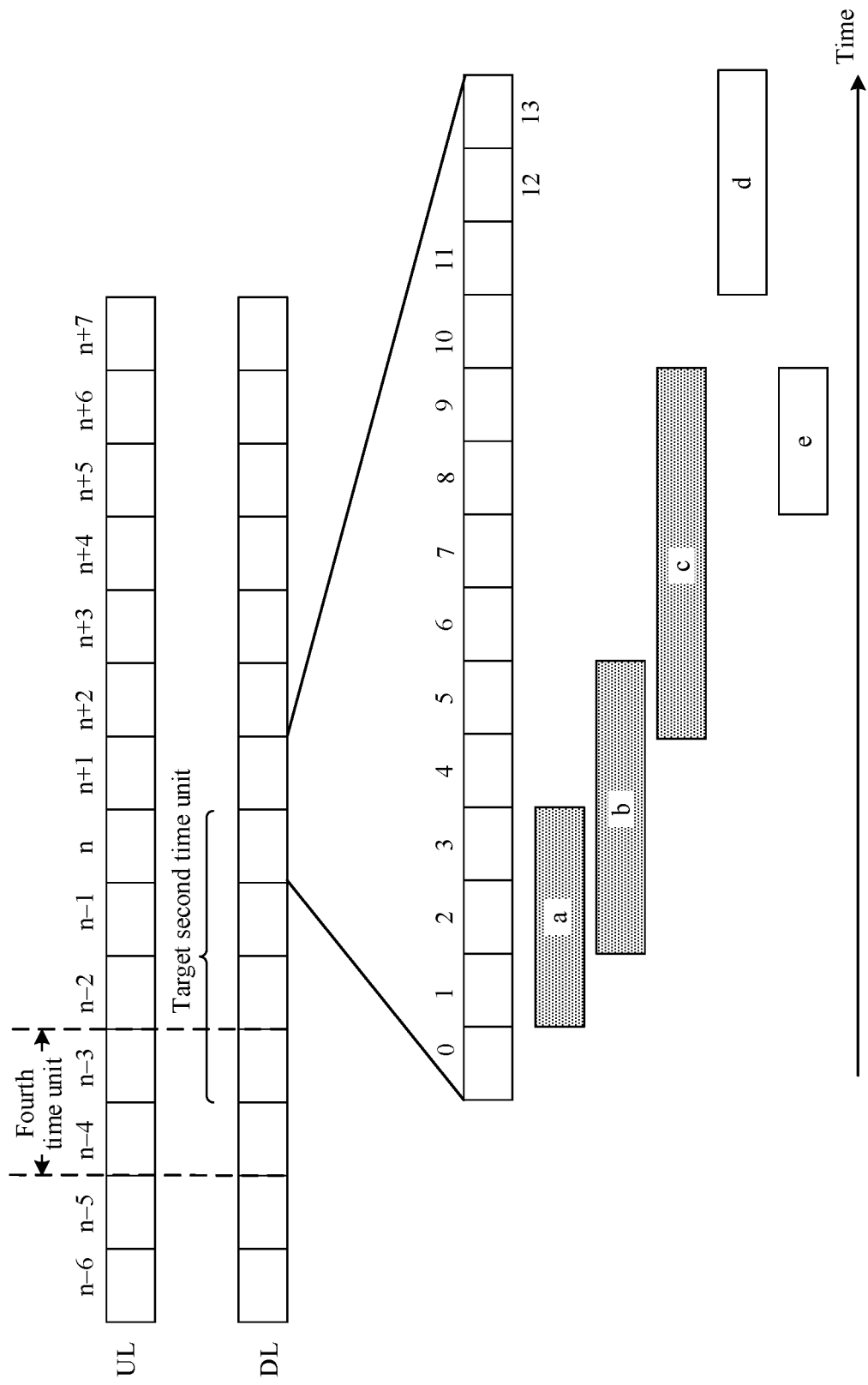
Figure 13C:
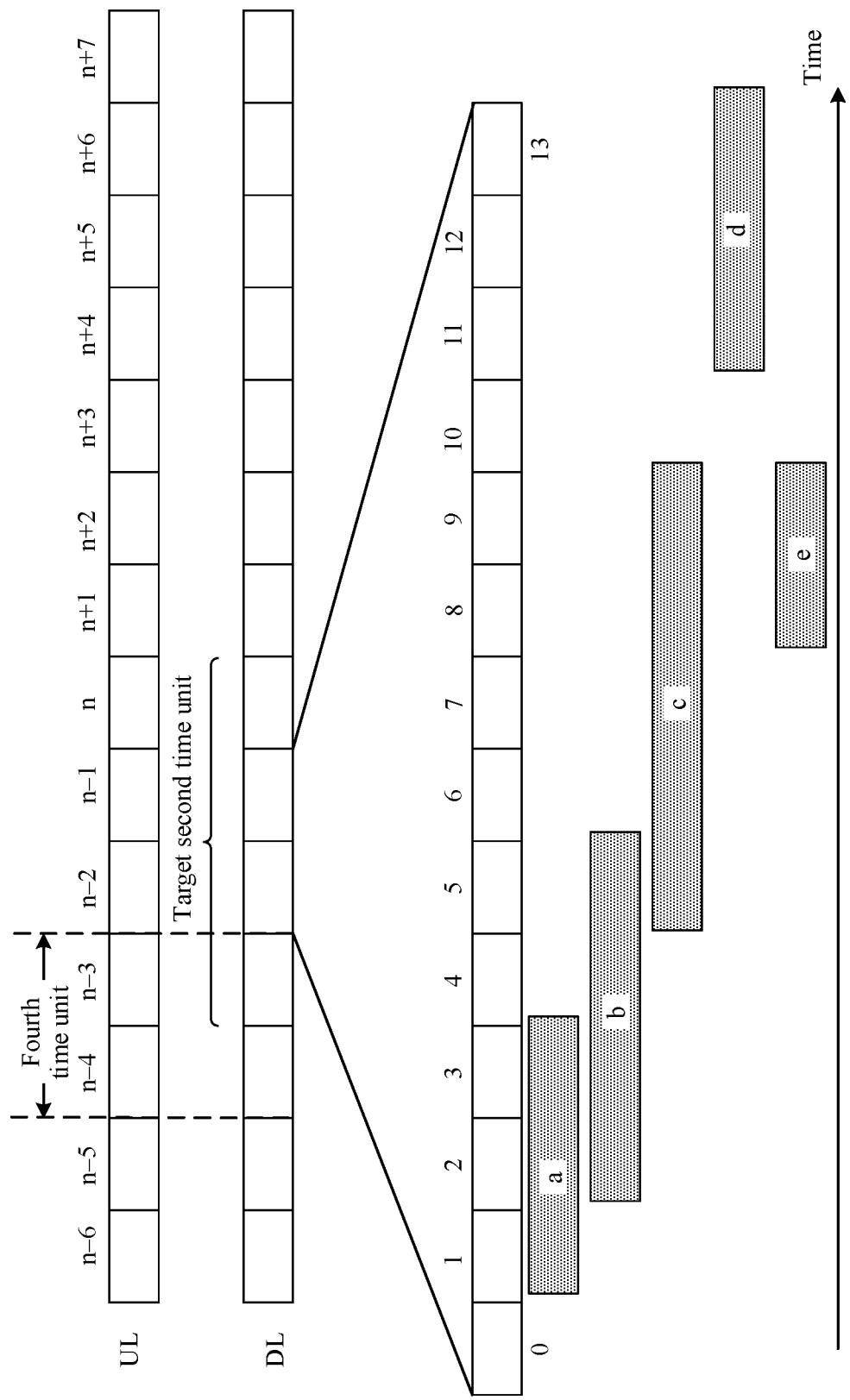

For still another example, it is assumed that the length of the fourth time unit is one slot, the length of the second time unit is ½ slot, the determined second time unit is the second time unit numbered n, and the k1 set is {0, 1, 2, 3}. Configured time domain resources are as shown in FIG. 6. In addition, the part of time domain resources includes the time domain resource whose first symbol belongs to the target second time unit and the time domain resource whose last symbol belongs to the target second time unit. In this case, the part of time domain resources may be as shown in FIG. 13A to FIG. 13C. In FIG. 13A to FIG. 13C, the second time unit in which the feedback information corresponding to the downlink data is located is the ½ slot numbered n. With reference to the k1 set, it may be determined that the set of the ½ slots numbered n−3, n−2, n−1, and n is the target second time unit. Specifically, as shown in FIG. 13A, the last symbols of a time domain resource c, a time domain resource d, and a time domain resource e in five time domain resources in the slot in which the ½ slots numbered n−4 and n−3 are located belong to the ½ slot numbered n−3 (that is, belong to the target second time unit), and the first symbols of the time domain resources d and e belong to the ½ slot numbered n−3 (that is, belong to the target second time unit). Therefore, the part of time domain resources includes the time domain resources c, d, and e in the slot in which the ½ slots numbered n−4 and n−3 are located, so that the feedback codebook includes feedback information of candidate occasions that correspond to the time domain resources c, d, and e and that are in the slot in which the ½ slots numbered n−4 and n−3 are located. As shown in FIG. 13B, the last symbols of a time domain resource a and a time domain resource b in five time domain resources in the slot in which the ½ slots numbered n+1 and n are located belong to the ½ slot numbered n (that is, belong to the target second time unit), and the first symbols of time domain resources a, b, and c belong to the ½ slot numbered n (that is, belong to the second time unit). Therefore, the part of time domain resources includes the time domain resources a, b, and c in the slot in which the ½ slots numbered n+1 and n are located, so that the feedback codebook includes feedback information of candidate occasions that correspond to the time domain resources a, b, and c and that are in the slot in which the ½ slots numbered n+1 and n are located. As shown in FIG. 13C, the last symbols and the first symbols of five time domain resources in the slot in which the ½ slots numbered n−2 and n−1 are located all belong to the slot in which the ½ slots numbered n−2 and n−1 are located (that is, belong to the target second time unit). Therefore, the part of time domain resources includes all time domain resources in the slot in which the ½ slots numbered n−2 and n−1 are located, so that the feedback codebook includes feedback information of candidate occasions that correspond to all the time domain resources and that are in the slot in which the ½ slots numbered n−2 and n−1 are located.

It should be noted that, after the part of time domain resources is determined, the part of time domain resources may be grouped in the target second time unit in a manner similar to the foregoing grouping method for time domain resources configured in one slot, to further determine a candidate occasion. For example, for FIG. 11A and FIG. 11B, the time domain resources a and b may be grouped into one group, and the time domain resources c, d, and e may be in separate groups. For FIG. 12A and FIG. 12B, the time domain resources a and b may be grouped into one group, the time domain resources c and e are grouped into one group, and the time domain resource d may be in one group. For FIG. 13A, the time domain resources a and b may be grouped into one group, the time domain resources c and e are grouped into one group, and the time domain resource d may be in one group. For FIG. 13B, the time domain resources a and b may be grouped into one group, and the time domain resources c, d, and e may be in separate groups.

It should be noted that, when the network device configures, for the terminal device, all time domain resources that are in a time unit less than or equal to the second time unit and that are used by the terminal device to receive the downlink data, or when the network device configures, for the terminal device, all time domain resources that are in the third time unit and that are used by the terminal device to receive the downlink data, but a symbol range of a candidate occasion is fully covered in one second time unit, the quantity of bits of the feedback codebook sent in one second time unit may also be determined in any one of the foregoing three manners. Alternatively, the quantity of bits of the feedback codebook sent in one second time unit may be determined based on, for example, the candidate occasion of the target second time unit. This may not be limited in this application.

It should be noted that a sequence between step 202, step 203 and step 204 is not limited in this embodiment.

According to the communication method provided in this embodiment, the network device sends the downlink data to the terminal device in the first time unit, the network device and the terminal device determine, based on k1 corresponding to the downlink data, the second time unit in which the feedback information corresponding to the downlink data is located, and the terminal device sends, in the second time unit, the feedback codebook including the feedback information corresponding to the downlink data to the network device. In this way, in a time end location in one second time unit, feedback information included in the second time unit can be sent to the network device. Because the second time unit is less than one slot, compared with sending feedback information included in the slot to the network device until a time end location in one slot, a time at which feedback information is sent is advanced, so that a NACK of the downlink data corresponding to the terminal device can be fed back to the network device earlier to enable the network device to retransmit the downlink data, thereby reducing a transmission latency of downlink data. In addition, in any one of the foregoing Manner 1 to Manner 3, a consistent understanding on the quantity of bits of the feedback codebook between the network device and the terminal device can be ensured, so that effectiveness of communication is ensured.

Figure 14:
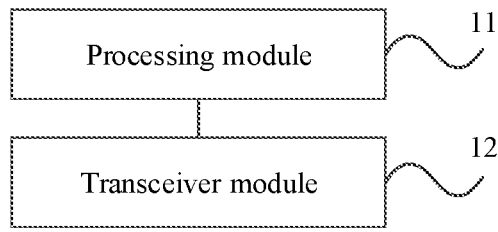
FIG. 14 to FIG. 17 are schematic structural diagrams of a communications apparatus according to an embodiment of this application.

FIG. 14 is a schematic structural diagram of a communications apparatus according to an embodiment of this application. The communications apparatus in this embodiment may be applied to a terminal device. The communications apparatus may be configured to perform a function of the terminal device in the method embodiment shown in FIG. 2. As shown in FIG. 14, the communications apparatus may include a processing module 11 and a transceiver module 12. The processing module 11 is configured to determine a first time unit for receiving downlink data.

The processing module 11 is further configured to determine, based on k1 corresponding to the downlink data, a second time unit in which feedback information corresponding to the downlink data is located, a length of the first time unit is greater than or equal to a length of the second time unit, k1 is a nonnegative integer, k1 represents a quantity of time units from the first time unit to the second time unit, and the length of the second time unit is less than one slot.

The transceiver module 12 is configured to send, in the second time unit determined by the processing module 11, a feedback codebook to the network device, where the feedback codebook includes the feedback information corresponding to the downlink data.

In an implementable design, when the length of the first time unit is greater than the length of the second time unit, and k1 is equal to 0, the second time unit is the last second time unit in a third time unit, and the third time unit is a first time unit whose number is the same as that of the first time unit for receiving the downlink data.

In an implementable design, the length of the first time unit is equal to one slot.

In an implementable design, the feedback codebook includes feedback information corresponding to a candidate occasion of a target first time unit, and the candidate occasion is used by the terminal device to receive the downlink data.

The target first time unit is a set of first time units in which the target second time unit is located, the length of the first time unit is greater than the length of the second time unit, and the target first time unit includes the first time unit for receiving the downlink data; and the target second time unit is a set of second time units that is determined based on the k1 set and the second time unit in which the feedback information corresponding to the downlink data is located, and the k1 set is a set of at least one value of k1.

In an implementable design, the feedback codebook includes feedback information corresponding to a target candidate occasion, the target candidate occasion includes a candidate occasion in which the last symbol of a target fourth time unit belongs to the target second time unit, and/or a candidate occasion in which the first symbol of the target fourth time unit belongs to the target second time unit, the candidate occasion is used by the terminal device to receive the downlink data, and the target candidate occasion includes the candidate occasion for receiving the downlink data.

The target fourth time unit is a set of fourth time units in which the target second time unit is located, and a length of the fourth time unit is greater than the length of the second time unit; and the target second time unit is the set of second time units that is determined based on the k1 set and the second time unit in which the feedback information corresponding to the downlink data is located, and the k1 set is the set of at least one value of k1.

In an implementable design, the feedback codebook includes feedback information corresponding to the candidate occasion of the target second time unit, the candidate occasion is used by the terminal device to receive the downlink data, and the candidate occasion includes the candidate occasion for receiving the downlink data.

The target second time unit is the set of second time units that is determined based on the k1 set and the second time unit in which the feedback information corresponding to the downlink data is located, and the k1 set is the set of at least one value of k1; and the candidate occasion is determined based on a part of all configured time domain resources used by the terminal device to receive the downlink data, where the part of time domain resources includes a time domain resource whose first symbol belongs to the target second time unit, and/or a time domain resource whose last symbol belongs to the target second time unit.

In an implementable design, the length of the second time unit is equal to a half of one slot.

The communications apparatus provided in this embodiment of this application may perform an action of the terminal device in the foregoing method embodiment. An implementation principle and a technical effect of the communications apparatus are similar to those in the method embodiment. Details are not described herein again.

Figure 15:
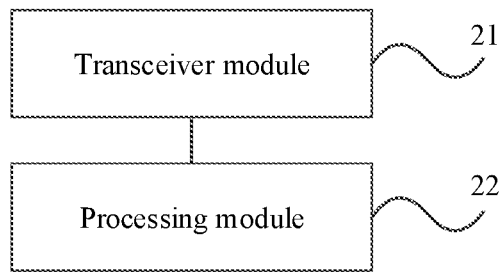

FIG. 15 is a schematic structural diagram of a communications apparatus according to an embodiment of this application. The communications apparatus in this embodiment may be applied to a network device. The communications apparatus may be configured to perform a function of the network device in the method embodiment shown in FIG. 2. As shown in FIG. 15, the communications apparatus may include a transceiver module 21 and a processing module 22. The transceiver module 21 is configured to send downlink data to a terminal device in a first time unit.

The processing module 22 is configured to determine, based on k1 corresponding to the downlink data sent by the transceiver module 21, a second time unit in which feedback information corresponding to the downlink data is located, a length of the first time unit is greater than or equal to a length of the second time unit, k1 is a nonnegative integer, k1 represents a quantity of time units from the first time unit to the second time unit, and the length of the second time unit is less than one slot.

The transceiver module 21 is further configured to receive, in the second time unit determined by the processing module 21, a feedback codebook from the terminal device, where the feedback codebook includes the feedback information corresponding to the downlink data.

In an implementable design, when the length of the first time unit is greater than the length of the second time unit, and k1 is equal to 0, the second time unit is the last second time unit in a third time unit, and the third time unit is a first time unit whose number is the same as that of the first time unit for sending the downlink data.

In an implementable design, the length of the first time unit is equal to one slot.

In an implementable design, the feedback codebook includes feedback information corresponding to a candidate occasion of a target first time unit, and the candidate occasion is used by the terminal device to receive the downlink data.

The target first time unit is a set of first time units in which a target second time unit is located, the length of the first time unit is greater than the length of the second time unit, and the target first time unit includes the first time unit for sending the downlink data to the terminal device; and the target second time unit is a set of second time units that is determined based on a k1 set and the second time unit in which the feedback information corresponding to the downlink data is located, and the k1 set is a set of at least one value of k1.

In an implementable design, the feedback codebook includes feedback information corresponding to a target candidate occasion, the target candidate occasion includes a candidate occasion in which the last symbol of a target fourth time unit belongs to the target second time unit, and/or a candidate occasion in which the first symbol of the target fourth time unit belongs to the target second time unit, the candidate occasion is used by the terminal device to receive the downlink data, and the target candidate occasion includes the candidate occasion for sending the downlink data to the terminal device.

The target fourth time unit is a set of fourth time units in which the target second time unit is located, and a length of the fourth time unit is greater than the length of the second time unit; and the target second time unit is the set of second time units that is determined based on the k1 set and the second time unit in which the feedback information corresponding to the downlink data is located, and the k1 set is the set of at least one value of k1.

In an implementable design, the feedback codebook includes feedback information corresponding to the candidate occasion of the target second time unit, the candidate occasion is used by the terminal device to receive the downlink data, and the candidate occasion includes the candidate occasion for sending the downlink data to the terminal device.

The target second time unit is the set of second time units that is determined based on the k1 set and the second time unit in which the feedback information corresponding to the downlink data is located, and the k1 set is the set of at least one value of k1; and the candidate occasion is determined based on a part of all configured time domain resources used by the terminal device to receive the downlink data, where the part of time domain resources includes a time domain resource whose first symbol belongs to the target second time unit, and/or a time domain resource whose last symbol belongs to the target second time unit.

In an implementable design, the length of the second time unit is equal to a half of one slot.

The communications apparatus provided in this embodiment of this application may perform an action of the network device in the foregoing method embodiment. An implementation principle and a technical effect of the communications apparatus are similar to those in the method embodiment. Details are not described herein again.

It should be noted that the transceiver module may be a transceiver in actual implementation. The processing module may be implemented in a form of software invoked by a processing element, or may be implemented in a form of hardware. For example, the processing module may be a separately disposed processing element, or may be integrated into a chip of the foregoing apparatus for implementation. In addition, the processing module may alternatively be stored in a memory of the foregoing apparatus in a form of program code, and is invoked by a processing element of the foregoing apparatus to perform a function of the processing module. In addition, all or some of the modules may be integrated together, or may be implemented independently. The processing element described herein may be an integrated circuit with a signal processing capability. In an implementation process, the steps in the method or the modules can be implemented by using a hardware integrated logic circuit in the processing element, or by using instructions in a form of software.

For example, the foregoing modules may be configured as one or more integrated circuits for implementing the foregoing method, such as one or more application-specific integrated circuits (ASIC), one or more microprocessors (digital signal processors or DSPs), or one or more field programmable gate arrays (FPGA). For another example, when one of the foregoing modules is implemented in a form of scheduling program code by a processing element, the processing element may be a general-purpose processor, for example, a central processing unit (CPU) or another processor that can invoke the program code. For another example, the modules may be integrated together, and implemented in a form of a system-on-a-chip (SOC).

Figure 16:
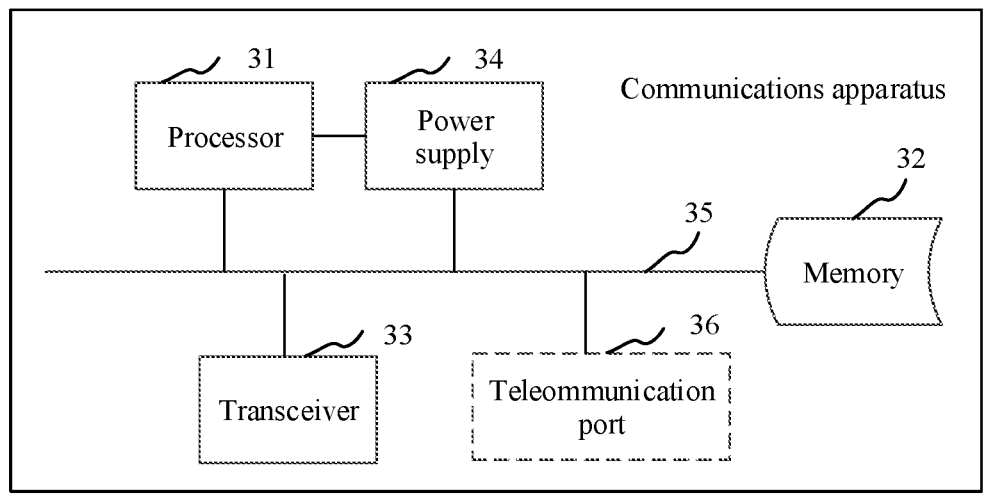

FIG. 16 is a schematic structural diagram of a communications apparatus according to an embodiment of this application. As shown in FIG. 16, the communications apparatus may include a processor 31 (for example, a CPU), a memory 32, and a transceiver 33. The transceiver 33 is coupled to the processor 31, and the processor 31 controls a receiving action of the transceiver 33. The memory 32 may include a high-speed random access memory (RAM), and may further include a non-volatile memory (NVM), for example, at least one magnetic disk memory. The memory 32 may store various instructions, to complete various processing functions and implement steps of the method in this application. For example, the communications apparatus in this application may further include a power supply 34, a communications bus 35, and a telecommunication port 36. The transceiver 33 may be integrated into a transceiver of the communications apparatus, or may be independent transceiver antennas on the communications apparatus. The communications bus 35 is configured to implement communication connection between elements. The telecommunication port 36 is configured to implement connection and communication between the communications apparatus and another peripheral.

In this embodiment of this application, the memory 32 is configured to store computer-executable program code, and the program code includes an instruction. When the processor 31 executes the instruction, the instruction enables the processor 31 of the communications apparatus to perform a processing action of the terminal device in the foregoing method embodiment, and enables the transceiver 33 to perform receiving and sending actions of the terminal device in the foregoing method embodiment or the optional embodiments. Implementation principles and technical effects thereof are similar, and details are not described herein again.

Figure 17:
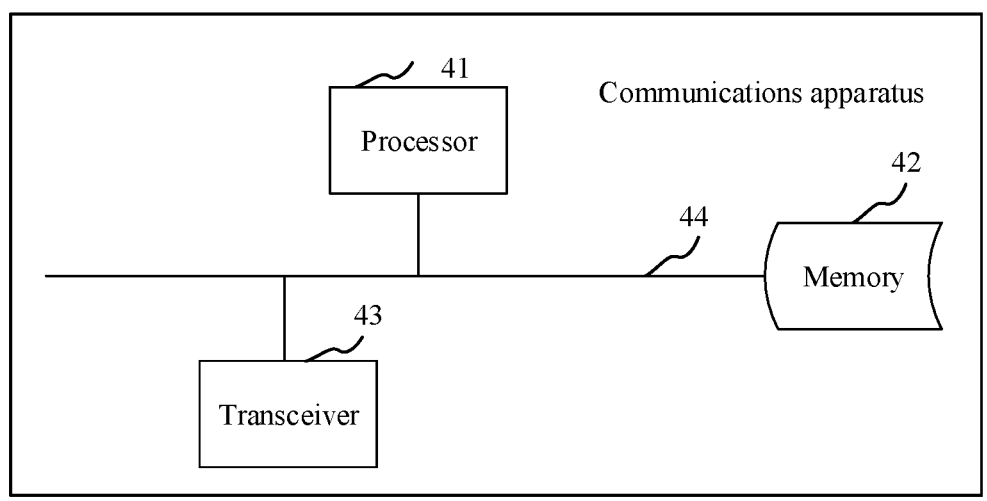

FIG. 17 is a schematic structural diagram of a communications apparatus according to an embodiment of this application. As shown in FIG. 17, the communications apparatus may include a processor 41 (for example, a CPU), a memory 42, and a transceiver 43. The transceiver 43 is coupled to the processor 41, and the processor 41 controls receiving and sending actions of the transceiver 43. The memory 42 may include a high-speed random access memory (RAM), and may further include a non-volatile memory (NVM), for example, at least one magnetic disk memory. The memory 42 may store various instructions, to complete various processing functions and implement steps of the method in this application. For example, the communications apparatus in this application may further include a communications bus 44. The transceiver 43 may be integrated into a transceiver of the communications apparatus, or may be independent transceiver antennas on the communications apparatus. The communications bus 44 is configured to implement communication connection between elements. The telecommunication port 46 is configured to implement connection and communication between the communications apparatus and another peripheral.

In this embodiment of this application, the memory 42 is configured to store computer-executable program code, and the program code includes an instruction. When the processor 41 executes the instruction, the instruction enables the processor 41 of the communications apparatus to perform a processing action of the network device in the foregoing embodiments or the optional embodiments, and enables the transceiver 43 to perform receiving and sending actions of the network device in the foregoing method embodiment. Implementation principles and technical effects thereof are similar, and details are not described herein again.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

"A plurality of" in this application refers to two or more than two. The term "and/or" in this specification is only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects. In a formula, the character "/" indicates a "division" relationship between associated objects.

What is claimed is:

1. A communication method, the method comprising:
    determining, by a terminal device, a first time unit for receiving downlink data;
    determining, by the terminal device, based on a nonnegative integer k1 corresponding to the downlink data, a second time unit in which feedback information corresponding to the downlink data is located, wherein a length of the first time unit is greater than or equal to a length of the second time unit, the k1 corresponding to the downlink data represents a quantity of time units from the first time unit to the second time unit in which feedback information corresponding to the downlink data is located, and the length of the second time unit is less than one slot; and
    sending, by the terminal device, in the second time unit in which feedback information corresponding to the downlink data is located, a feedback codebook to a network device, wherein the feedback codebook comprises the feedback information corresponding to the downlink data,
    wherein the feedback codebook comprises feedback information corresponding to a candidate occasion of a target second time unit, the candidate occasion is used by the terminal device to receive downlink data, and
    the target second time unit is a set of second time units that is determined based on a k1 set and the second time unit in which the feedback information corresponding to the downlink data is located, and the k1 set is a set of values of k1, and the candidate occasion is determined based on configured time domain resources used by the terminal device to receive downlink data, wherein the configured time domain resources comprise a time domain resource whose last symbol belongs to the target second time unit.

2. The method according to claim 1, wherein based on that the length of the first time unit is greater than the length of the second time unit, and k1 is equal to 0, the second time unit is the last second time unit in a third time unit, and the third time unit is a first time unit whose number is the same as that of the first time unit for receiving the downlink data.

3. The method according to claim 1, wherein the length of the first time unit is equal to one slot.

4. The method according to claim 1, wherein the feedback codebook comprises feedback information corresponding to a candidate occasion of a target first time unit, and the candidate occasion is used by the terminal device to receive the downlink data, the target first time unit is a set of first time units in which the target second time unit is located, the length of the first time unit is greater than the length of the second time unit, and the target first time unit comprises the first time unit for receiving the downlink data.

5. The method according to claim 1, wherein the feedback codebook comprises feedback information corresponding to a target candidate occasion, the target candidate occasion comprises at least one of:
  a candidate occasion in which the last symbol of a target fourth time unit belongs to the target second time unit, or
  a candidate occasion in which the first symbol of the target fourth time unit belongs to the target second time unit,
the candidate occasion is used by the terminal device to receive the downlink data, and the target candidate occasion comprises the candidate occasion for receiving the downlink data,
the target fourth time unit is a set of fourth time units in which the target second time unit is located, and a length of the fourth time unit is greater than the length of the second time unit.

6. The method according to claim 1, wherein the length of the second time unit is equal to a half of one slot.

7. A communication method, the method comprising:
  sending, by a network device, downlink data to a terminal device in a first time unit;
  determining, by the network device, based on a nonnegative integer k1 corresponding to the downlink data, a second time unit in which feedback information corresponding to the downlink data is located, wherein a length of the first time unit is greater than or equal to a length of the second time unit, the k1 corresponding to the downlink data represents a quantity of time units from the first time unit to the second time unit in which feedback information corresponding to the downlink data is located, and the length of the second time unit is less than one slot; and
  receiving, by the network device, in the second time unit in which feedback information corresponding to the downlink data is located, a feedback codebook from the terminal device, wherein the feedback codebook comprises the feedback information corresponding to the downlink data,
  wherein the feedback codebook comprises feedback information corresponding to a candidate occasion of a target second time unit, the candidate occasion is used by the terminal device to receive downlink data, and
  the target second time unit is a set of second time units that is determined based on a k1 set and the second time unit in which the feedback information corresponding to the downlink data is located, and the k1 set is a set of values of k1, and the candidate occasion is determined based on configured time domain resources used by the terminal device to receive downlink data, wherein the configured time domain resources comprise a time domain resource whose last symbol belongs to the target second time unit.

8. The method according to claim 7, wherein based on that the length of the first time unit is greater than the length of the second time unit, and k1 is equal to 0, the second time unit is the last second time unit in a third time unit, and the third time unit is a first time unit whose number is the same as that of the first time unit for sending the downlink data.

9. The method according to claim 7, wherein the length of the first time unit is equal to one slot.

10. The method according to claim 7, wherein the feedback codebook comprises feedback information corresponding to a candidate occasion of a target first time unit, and the candidate occasion is used by the terminal device to receive the downlink data, and wherein the target first time unit is a set of first time units in which the target second time unit is located, the length of the first time unit is greater than the length of the second time unit, and the target first time unit comprises the first time unit for sending the downlink data to the terminal device.

11. The method according to claim 7, wherein the feedback codebook comprises feedback information corresponding to a target candidate occasion, the target candidate occasion comprises at least one of a candidate occasion in which the last symbol of a target fourth time unit belongs to the target second time unit, or a candidate occasion in which the first symbol of the target fourth time unit belongs to the target second time unit, the candidate occasion is used by the terminal device to receive the downlink data, and the target candidate occasion comprises the candidate occasion for sending the downlink data to the terminal device; and
  wherein the target fourth time unit is a set of fourth time units in which the target second time unit is located, and a length of the fourth time unit is greater than the length of the second time unit.

12. The method according to claim 7, wherein the length of the second time unit is equal to a half of one slot.

13. A communications apparatus, the apparatus comprising:
  a processor, configured to determine a first time unit for receiving downlink data, wherein
  the processor is further configured to determine, based on a nonnegative integer k1 corresponding to the downlink data, a second time unit in which feedback information corresponding to the downlink data is located, a length of the first time unit is greater than or equal to a length of the second time unit, the k1 corresponding to the downlink data represents a quantity of time units from the first time unit to the second time unit in which feedback information corresponding to the downlink data is located, and the length of the second time unit is less than one slot; and
  a transceiver, configured to send, in the second time unit in which feedback information corresponding to the downlink data is located determined by the processor, a feedback codebook to a network device, wherein the feedback codebook comprises the feedback information corresponding to the downlink data,
  wherein the feedback codebook comprises feedback information corresponding to a candidate occasion of a target second time unit, the candidate occasion is used by the communications apparatus to receive downlink data, and
  the target second time unit is a set of second time units that is determined based on a k1 set and the second time unit in which the feedback information corresponding to the downlink data is located, and the k1 set is a set of values of k1, and the candidate occasion is determined based on configured time domain resources used by the communications apparatus to receive the downlink data, wherein the configured time domain resources comprise a time domain resource whose last symbol belongs to the target second time unit.

14. The apparatus according to claim 13, wherein based on that the length of the first time unit is greater than the length of the second time unit, and k1 is equal to 0, the second time unit is the last second time unit in a third time unit, and the third time unit is a first time unit whose number is the same as that of the first time unit for receiving the downlink data.

15. The apparatus according to claim 13, wherein the length of the first time unit is equal to one slot.

16. A communications apparatus, the apparatus comprising:
- a transceiver, configured to send downlink data to a terminal device in a first time unit; and
- a processor, configured to determine, based on a nonnegative integer k1 corresponding to the downlink data sent by the transceiver, a second time unit in which feedback information corresponding to the downlink data is located, a length of the first time unit is greater than or equal to a length of the second time unit, the k1 corresponding to the downlink data represents a quantity of time units from the first time unit to the second time unit in which feedback information corresponding to the downlink data is located, and the length of the second time unit is less than one slot, wherein
- the transceiver is further configured to receive, in the second time unit in which feedback information corresponding to the downlink data is located determined by the processor, a feedback codebook from the terminal device, wherein the feedback codebook comprises the feedback information corresponding to downlink data, wherein the feedback codebook comprises feedback information corresponding to a candidate occasion of a target second time unit, the candidate occasion is used by the terminal device to receive the downlink data, and
- the target second time unit is a set of second time units that is determined based on a k1 set and the second time unit in which the feedback information corresponding to the downlink data is located, and the k1 set is a set of values of k1, and the candidate occasion is determined based on configured time domain resources used by the terminal device to receive the downlink data, wherein the configured time domain resources comprise a time domain resource whose last symbol belongs to the target second time unit.

17. The apparatus according to claim 16, wherein based on that the length of the first time unit is greater than the length of the second time unit, and k1 is equal to 0, the second time unit is the last second time unit in a third time unit, and the third time unit is a first time unit whose number is the same as that of the first time unit for sending the downlink data.

18. The apparatus according to claim 16, wherein the length of the first time unit is equal to one slot.

* * * * *